(12) United States Patent
Shapero et al.

(10) Patent No.: US 12,498,225 B2
(45) Date of Patent: Dec. 16, 2025

(54) CHAIN

(71) Applicant: Georgia Tech Research Corporation, Atlanta, GA (US)

(72) Inventors: Samuel Shapero, Atlanta, GA (US); Matthew Lashley, Atlanta, GA (US); Daniel Levy, Atlanta, GA (US); Mark H. Smith, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 166 days.

(21) Appl. No.: 18/463,938

(22) Filed: Sep. 8, 2023

(65) Prior Publication Data

US 2024/0369364 A1    Nov. 7, 2024

Related U.S. Application Data

(60) Provisional application No. 63/404,657, filed on Sep. 8, 2022.

(51) Int. Cl.
| | | |
|---|---|---|
| *G01C 21/16* | (2006.01) | |
| *G01C 21/20* | (2006.01) | |
| *G05D 1/695* | (2024.01) | |
| *G05D 101/00* | (2024.01) | |

(52) U.S. Cl.
CPC .......... *G01C 21/165* (2013.01); *G01C 21/20* (2013.01); *G05D 1/696* (2024.01); *G05D 2101/24* (2024.01)

(58) Field of Classification Search
None
See application file for complete search history.

(56) References Cited

U.S. PATENT DOCUMENTS

| 10,107,627 B2 | 10/2018 | Aboutalib et al. | |
|---|---|---|---|
| 10,365,363 B2 | 7/2019 | Rohr et al. | |
| 12,069,487 B1 * | 8/2024 | Nobbe | H04W 16/28 |
| 2015/0334768 A1 * | 11/2015 | Ranasinghe | G06V 10/84 |
| | | | 370/328 |

(Continued)

OTHER PUBLICATIONS

Chen M, Xiong Z, Xiong J, Wang R., A hybrid cooperative navigation method for UAV swarm based on factor graph and Kalman filter, Jan. 25, 2022, International Journal of Distributed Sensor Networks, pp. 1-14 doi:10.1177/15501477211064758 (Year: 2022).*

(Continued)

*Primary Examiner* — Jelani A Smith
*Assistant Examiner* — Davin Seol
(74) *Attorney, Agent, or Firm* — Meunier Carlin & Curfman LLC

(57) ABSTRACT

A distributed control system and method for decentralized, collaborative platform navigation, routing, and/or control are disclosed employing a distributed, factorized positioning, navigation, and timing chain that can link platforms or nodes having local sensors together by their local inertial and ranging measurements. In the distributed, factorized PNT chain, each platform maintains and contributes local measurements as states to a set of dynamically assigned parent node for a platform cluster, each parent nodes and associated clusters links to at least one other parent node aggregates the states of the platforms in the cluster and passes/propagates states of a linked clustered.

20 Claims, 11 Drawing Sheets

(56) References Cited

U.S. PATENT DOCUMENTS

| | | | |
|---|---|---|---|
| 2020/0284917 A1* | 9/2020 | Pierro | G01S 13/9005 |
| 2021/0373855 A1* | 12/2021 | Sun | G06F 9/30036 |
| 2022/0365165 A1* | 11/2022 | Kirchner | G01S 19/47 |
| 2022/0400454 A1* | 12/2022 | Park | H04W 56/001 |
| 2023/0243623 A1* | 8/2023 | Brewer | F41G 7/346 244/3.2 |

OTHER PUBLICATIONS

Tang, Chengkai, et al. "Factor graph-assisted distributed cooperative positioning algorithm in the GNSS system." Sensors 18.11 (2018): 3748.

A. Savvides, H. Park, and M. B. Srivastava, "The n-hop multilateration primitive for node localization problems," Mobile Networks and Applications, vol. 8, pp. 443-451, 2003.

A. Norrdine, "An algebraic solution to the multilateration problem," in Proceedings of the 15th international conference on indoor positioning and indoor navigation, Sydney, Australia, vol. 1315, 2012.

P. D. Groves, "Navigation using inertial sensors [tutorial]," IEEE Aerospace and Electronic Systems Magazine, vol. 30, No. 2, pp. 42-69, 2015.

K. Yousif, A. Bab-Hadiashar, and R. Hoseinnezhad, "An overview to visual odometry and visual slam: Applications to mobile robotics" Intelligent Industrial Systems, vol. 1, No. 4, pp. 289-311, 2015.

W. R. Fried, "Principles and simulation of jtids relative navigation," IEEE Transactions on Aerospace and Electronic Systems, No. 1, pp. 76-84, 1978.

W. Altrichter, "Jtids relative navigation and data registration," in IEEE Plans 92 Position Location and Navigation Symposium Record, pp. 152-161, 1992.

T. H. Kerr and L. Chin, "A stable decentralized filtering implementation for jtids relnav(stable community relative navigation)," in PLANS'80-Position Location and Navigation Symposium, Atlantic City, NJ, pp. 318-329, 1980.

H.-A. Loeliger, "An introduction to factor graphs," IEEE Signal Processing Magazine, vol. 21, No. 1, pp. 28-41, 2004.

M. Kaess, H. Johannsson, R. Roberts, V. Ila, J. J. Leonard, and F. Dellaert, "isam2: Incremental smoothing and mapping using the bayes tree," The International Journal of Robotics Research, vol. 31, No. 2, pp. 216-235, 2012.

U. A. Khan and J. M. Moura, "Distributing the kalman filter for largescale systems," IEEE Transactions on Signal Processing, vol. 56, No. 10, pp. 4919-4935, 2008.

S. Das and J. M. Moura, "Consensus+ innovations distributed Kalman filter with optimized gains," IEEE Transactions on Signal Processing, vol. 65, No. 2, pp. 467-481, 2016.

H.-S. Shin, S. He, and A. Tsourdos, "Sample greedy gossip distributed kalman filter," Information Fusion, vol. 64, pp. 259-269, 2020.

V. Indelman, S. Williams, M. Kaess, and F. Dellaert, "Information fusion in navigation systems via factor graph based incremental smoothing," Robotics and Autonomous Systems, vol. 61, No. 8, pp. 721-738, 2013.

Y. Bar-Shalom, H. Chen, and M. Mallick, "One-step solution for the multistep out-of-sequence-measurement problem in tracking," IEEE Transactions on aerospace and electronic systems, vol. 40, No. 1, pp. 27-37, 2004.

* cited by examiner

Algorithm 1 Distributed factored filter

Given $k$, $\hat{x}^j_{k-1} \in \mathbb{R}^{15}$, $P^j_{k-1} \in \mathbb{R}^{15 \times 15}$, $\forall j \in \mathcal{P}$, $\hat{x}^c_{k-1} \in \mathbb{R}^{\rho|P^c|}$, $P^c_{k-1} \in \mathbb{R}^{\rho|P^c| \times \rho|P^c|}$, $\forall c \in \mathcal{C}$, $\mathcal{N}_k$, $\Gamma_k$, $A_k$, $\Phi_k$

Parallel For $j \in \mathcal{P}$
    $[\hat{x}^j_{k-}, P^j_{k-}, F^j_k] \leftarrow \text{Propagate}(\hat{x}^j_{k-1}, P^j_{k-1}, \mathcal{N}^j_k)$
    $[\hat{x}^j_{k0}, P^j_{k0}] \leftarrow \text{KalmanUpdate}(\hat{x}^j_{k-}, P^j_{k-}, [\eta^j_k, a^j_k])$
    $\psi^j_k \leftarrow \text{EquivProp}(\hat{x}^j_{k-1}, P^j_{k-1}, \hat{x}^j_{k-}, P^j_{k-1}, F^j_k)$

Parallel For $c \in \mathcal{C}$
    $\psi^c \leftarrow \psi^j_k, \forall j \in \mathcal{P}^c$
    $\Phi^c \leftarrow \phi^i_k(c_{ij}), \forall i \in \rho(c), j \in \mathcal{P}^c$
    $[\hat{x}^c_{k-}, P^c_{k-}] \leftarrow \text{Propagate}(\hat{x}^c_{k-1}, P^c_{k-1}, \Psi^c)$
    $[\hat{x}^c_{k0}, P^c_{k0}] \leftarrow \text{KalmanUpdate}(\hat{x}^c_{k-}, P^c_{k-}, \Phi^c)$ $\text{RecursiveEquivMeas}(\hat{X}_{k0}, P_{k0})$
$k \leftarrow k + 1$

*FIG. 5B*

CHAIN

CROSS-REFERENCE TO RELATED APPLICATIONS

This application claims the benefit of and priority to U.S. Patent Application No. 63/404,757, filed Sep. 8, 2022, which is hereby incorporated herein by reference in its entirety.

BACKGROUND

Unmanned vehicles, such as unmanned aerial systems (UASs) and other vehicles or structures, manned or unmanned, often rely on global navigation satellite system (GNSS) and/or global positioning system (GPS) data for navigation, routing, timing, and/or controls.

UASs and other unmanned or manned vehicles, aircraft, spacecraft, and various structures can be affected by GNSS and/or GPS-denial attacks. For example, GPS signals may be jammed or spoofed, resulting in missing or false GPS data. In a more extreme example, GPS satellites may be destroyed or otherwise rendered inoperable.

There is a benefit to providing alternative navigation, routing, and/or control to global navigation satellite systems and/or global positioning systems.

SUMMARY

A distributed control system and method for decentralized, collaborative platform navigation, routing, and/or control are disclosed employing a distributed, factorized positioning, navigation, and timing chain (referred to herein as a "distributed, factorized PNT chain") that can link platforms or nodes having local sensors together by their local inertial and ranging measurements. In the distributed, factorized PNT chain, each platform maintains and contributes local measurements as states to a set of dynamically assigned parent nodes for a platform cluster (also referred to as a "cluster clique"); each parent node and associated clusters links to at least one other parent node aggregates the states of the platforms in the cluster and passes/propagates states of a linked clustered. In doing so, the calculation of the positioning, navigation, and timing states are extremely efficient in being limited to those of the platforms in the clusters while taking into account propagated states of the linked cluster while the number of platforms in the distributed PNT chain network can be extremely large.

To further improve the efficiency of the distributed PNT chain network, the states can be factorized such that a subset of the states are propagated by the linked parent nodes/clusters, thereby reducing the communication information.

In an implementation, each platform within the distributed PNT chain network of platforms employs a navigation filter/manager system, such as would normally be used for typical navigation GPS-driven system, that can accept 'equivalent measurements' from other filters of other platforms that are periodically published as a 'propagation measurement', representing a change in a navigation state produced by on-board local sensors (e.g., IMU) since the last such propagation measurement. Each platform in each cluster can operate and maintain an active cluster filter that represents the navigation state of all the platforms in the respective cluster. One platform is then designated as a parent of the cluster. The filter also represents the navigation state of all the platforms in its current parent cluster. The cluster filter can accept propagation measurements and equivalent measurements from platforms in the cluster, equivalent measurements from other clusters, and range measurements from the ranging radios of linked platforms between platforms in its cluster or between platforms in its cluster and platforms in the parent cluster.

The exemplary distributed control system and method can be used to control a swarm of UAS (unmanned aerial systems) or other autonomous platforms, as well as other non-autonomous platforms, during a GPS denial attack.

The exemplary distributed control system and method can be implemented via a distributed factor graph as a runtime filter that can fuse the measured sensor data to generate consistent positioning data for each networked element of the swarm. The exemplary distributed control system and method employs equivalent measurements as a message-passing operation in combination with a control operation that can refactor the filter as the network topology changes.

In an aspect, a system is disclosed including: a first platform including: one or more position or inertial sensors (e.g., IMU, altimeter, gyroscope, accelerometers, combinations thereof); one or more ranging sensors (e.g., wireless network communication interface), including a first ranging sensor; and a controller having one or more processors and memory, the memory having instructions stored thereon, wherein the instructions when executed by the one or more processors of the first platform can cause the one or more processors to: receive sensor measurements from the one or more inertial sensors and the one or more ranging sensors; receive a message (e.g., equivalent measurement message) from a second platform (neighboring platform or otherwise) of a plurality of platforms; determine at least one of position, velocity, and orientation values for the first platform using the received sensor measurements and the message; determine, via a distributed estimation algorithm (e.g., distributed Kalman filter), a first set of estimated states as a subgraph (e.g., local clique and cluster clique) of a complete graph, wherein the subgraph can correspond to the first platform and a set of neighboring platforms, including a first neighboring platform, and wherein the complete graph can correspond to the plurality of platforms (wherein the platforms can be enrolled in membership to a fleet and can dynamically enter or exit that membership), wherein the message can include a second set of estimated states of the second platform for a set of neighboring platforms of the second platform; and execute control operations (e.g., inertial navigation control or other real-time control operation) to adjust at least one of position, velocity, navigation, steering, or a combination thereof of the first platform using the estimated states to maintain position or relative position or movement with, at least, the set of neighboring platforms.

In some implementations, the instructions, when executed by one or more processors of the first platform, further cause the one or more processors to transmit the first set of estimated states, or a portion thereof, for the set of the first platform and the neighboring platforms to the first neighboring platform, wherein the transmitted estimated states are combined by the first neighboring platform with other shared estimated states of other neighboring platforms to determine positioning, navigation and timing information for the first neighboring platform.

In some implementations, the distributed estimation algorithm comprises a distributed Kalman Filter generated via a graph factorization operation (e.g., implemented via a tree structure).

In some implementations, the first set of estimated states includes a set of state values, and the message includes a portion of the first set of estimated states (e.g., wherein the first platform and second platform each respectively determine an intersection between its states and the received states and transmits the intersection in its respective messages).

In some implementations, the instructions, when executed by one or more processors of the first platform, further cause the one or more processors to: establish pairing among the first platform and the second platform; and re-establish, at pre-defined time or criteria (e.g., missing communication from the pairing for a pre-defined number of expected messaging cycles), pairing among the first platform and another platform of the plurality of platforms (e.g., to provide healing of network).

In some implementations, re-establishing the pairing among the first platform and another platform of the plurality of platforms includes disconnecting the first platform and the second platform.

In some implementations, wherein the first platform further comprises a GPS receiver configured to determine a GPS-derived position of the first platform, the GPS-derived position being employed to provide positioning data to the distributed estimation algorithm.

In some implementations, the ranging sensors include an altimeter, the altimeter being configured to determine an altitude-derived position of the first platform, and the altitude-derived position being employed to provide positioning data to the distributed estimation algorithm.

In some implementations, the first set of estimated states is employed to determine position data for the first platform, wherein the position data is compared to GPS data derived by the first platform, and wherein the comparison is employed to detect an anomaly associated with the GPS data (e.g., due to jamming).

In some implementations, the ranging sensor includes a wireless network communication interface.

In some implementations, the ranging sensor is configured to interrogate with IR waveform, laser pulse, radio-frequency waveform, microwave pulse, or acoustic waveform.

In some implementations, the first platform comprises an unmanned vehicle or manned vehicle (terrestrial, aerial, submersible, space).

In some implementations, the first platform comprises an unmanned aerial vehicle.

In some implementations, the first platform and the second platform are the same type (i.e., have the same configuration and hardware).

In some implementations, the first platform and the second platform are different types (i.e., have different configurations and hardware).

In another aspect, a method is disclosed including: providing a first platform and a second platform each including one or more position or inertial sensors (e.g., IMU, altimeter, gyros, accelerometers, combinations thereof); one or more ranging sensors (e.g., wireless network communication interface), including a first ranging sensor; and a controller to execute a decentralized, collaborative navigation operation for a network of platforms; at the first platform, receiving a sensor measurement from the one or more inertial sensors and the one or more ranging sensors; receiving a message (e.g., equivalent measurement message) from a second platform (neighboring platform or otherwise) of a plurality of platforms; determining at least one of position, velocity, and orientation values for the first platform using the received sensor measurement and the message; determining, via a distributed estimation algorithm (e.g., distributed Kalman filter), a first set of estimated states as a subgraph (e.g., local clique and cluster clique) of a complete graph, wherein the subgraph can correspond to the first platform and a set of neighboring platforms, including a first neighboring platform, and wherein the complete graph can correspond to the plurality of platforms (wherein the platforms can be enrolled in membership to a fleet and can dynamically enter or exit that member), wherein the message can include a second set of estimated states of the second platform for a set of neighboring platforms of the second platform; and executing control operations (e.g., inertial navigation control or other real-time control operation) to adjust at least one of position, velocity, navigation, steering, or a combination thereof of the first platform using the estimated states to maintain position or relative position or movement with, at least, the set of neighboring platforms.

In some implementations, the method further comprises at the first platform, transmitting the first set of estimated states, or a portion thereof, for the set of the first platform and the neighboring platforms to the first neighboring platform, wherein the transmitted estimated states are combined by the first neighboring platform with other shared estimated states of other neighboring platforms to determine positioning, navigation and timing information for the first neighboring platform.

In some implementations, the distributed estimation algorithm comprises a distributed Kalman Filter generated via a graph factorization operation (e.g., implemented via a tree structure).

In some implementations, the method further comprises, at the first platform, establishing pairing among the first platform and the second platform; and re-establishing, at pre-defined time or criteria (e.g., missing communication from the pairing for a pre-defined number of expected messaging cycles), pairing among the first platform and another platform of the plurality of platforms (e.g., to provide healing of network).

In another aspect, a non-transitory computer readable medium is disclosed having instructions stored thereon, wherein the instructions when executed by a controller of a platform can cause the controller to: receive a message (e.g., equivalent measurement message) from a second platform (neighboring platform or otherwise) of a plurality of platforms; determine at least one of position, velocity, and orientation values for the first platform using the received sensor measurement and the message; determine, via a distributed estimation algorithm (e.g., distributed Kalman filter), a first set of estimated states as a subgraph (e.g., local clique and cluster clique) of a complete graph, wherein the subgraph can correspond to the first platform and a set of neighboring platforms, including a first neighboring platform, and wherein the complete graph can correspond to the plurality of platforms (wherein the platforms can be enrolled in membership to a fleet and can dynamically enter or exit that member), wherein the message can include a second set of estimated states of the second platform for a set of neighboring platforms of the second platform; and execute control operations (e.g., inertial navigation control or other real-time control operation) to adjust at least one of position, velocity, navigation, steering, or a combination thereof of the first platform using the estimated states to maintain position or relative position or movement with, at least, the set of neighboring platforms.

Additional features will be set forth in part in the description, which follows or may be learned by practice. The features will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

FIGS. 5A-5B show an example inertial navigation system model and operation that can execute in a platform of the distributed PNT chain, in accordance with an illustrative embodiment.

Figure 1:
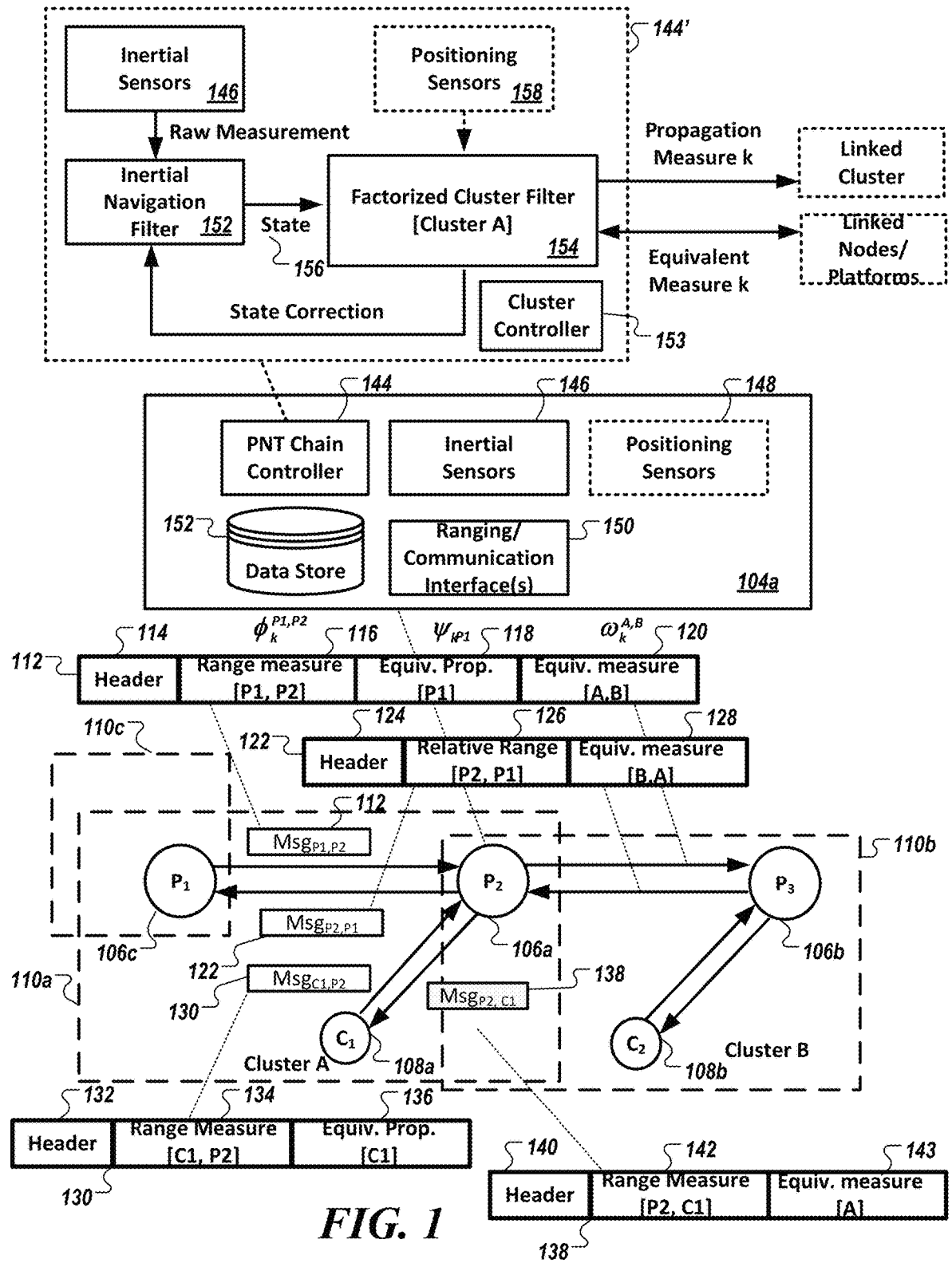
FIG. 1 shows an exemplary distributed control system for decentralized, collaborative platform navigation, routing, and/or control that forms a distributed, factorized positioning, navigation, and timing chain in accordance with an illustrative embodiment.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth reference in the list. All references cited and discussed in this specification are incorporated herein by reference in their entireties and to the same extent as if each reference was individually incorporated by reference.

Example System

FIG. 1 shows an exemplary distributed control system 100 for decentralized, collaborative platform navigation, routing, and/or control that forms a distributed, factorized positioning, navigation, and timing chain (referred to herein as a "distributed, factorized PNT chain") 102 in accordance with an illustrative embodiment.

The distributed, factorized PNT chain 102 links platforms 104 as nodes, shown being designated as or hosting parent nodes 106 and child nodes 108, that are dynamically assignable and re-assignable with such designations, based on graph factorization operations (e.g., executing an undirected Bayes Tree) and using anti-jamming local sensors that include local orientation and ranging measurements. In the distributed, factorized PNT chain 102, each platform 104 maintains and shares local measurements as states to its parent node 106 that maintains its orientation and positioning states and the same states for its cluster 110 (also referred to as a cluster clique). Each parent node 106 links to other parent nodes 106 of other nearby linked clusters 110. At least one of the parent nodes 106, that is outside an affected jamming region, is configured to have absolute positioning data, e.g., via received global positioning satellite data, to provide a frame of reference to other platforms 104 in the decentralized, distributed network.

The PNT chain allows decentralized, collaborative GPS-denied navigation for a distributed PNT chain network of platforms with navigation sensors and ranging radios. The distributed PNT chain network is highly dynamic. Ranging measurements between pairs of the platforms can be employed for both ranging as well as communication. The platforms 104 are organized into clusters 110 of at least two platforms each. Platforms 104 in the cluster 110 are all connected via the ranging measurement and communication links.

Graph structure. The clusters 110, for the purpose of state tracking and estimation, is preferably dynamically organized in a graph structure, where a 'node' in the graph represents a cluster, and an 'edge' between two nodes represents at least three range radio links between platforms in the respective clusters (e.g., cluster clique).

In the example shown in FIG. 1, two clusters "A" (shown as 110a) and "B" (shown as 110b), e.g., as cluster cliques, are shown that are respectively managed or hosted by parent nodes 106a, 106b (shown as "P2" 106a and "P3" 106b). The parent node "P2" 106a, in this example, is currently linked to child node "C1" 108a, and the parent node "P3" 106b is currently linked to child node "C2" 108b. The platforms 104 can communicate via bi-directional communication that may be broadcasted or multicasted. In the example shown in FIG. 1, the parent nodes 106a, 106b and child nodes 108a, 108b are shown performing bi-directional broadcasted communication.

Parent Node in Cluster. At least one platform ("parent node") in each cluster maintains an active cluster filter, which represents the navigation state of all the platforms in the cluster (e.g., cluster cliques). The parent node for the cluster is re-assignable. To be established as a proper parent node for a given cluster (e.g., cluster clique) for state tracking, e.g., via pairing controller 153: (i) the candidate platform in the cluster should have at least three range radio links with the platforms (i.e., child nodes) in the cluster, (ii) the parent node should not already be a child node, or a child of a child, or some other 'descendant'. The parent node preferably would have more navigation information content than other platforms in the respective cluster. When a new parent node is identified, the cluster controller of the respective platform properly initializes the navigation state of the platforms in the cluster.

Optionally, the pairing controller (e.g., 153) can have the ability indicate to a subservient node (e.g., child node) to 'take over' as a parent node from its current parent node, e.g., inverting their relationship. The pairing controller may minimize redundant information being presented to the controller (e.g., cluster filter), to prevent over-correlation errors. When switching parents, the cluster controller is configured, in some embodiments, to actively remove state information from the navigation filter of the new parent node that may be redundant when the states of the new parent nodes are initialized. Pairing controller (e.g., 153) can establish pairing between platforms for the purposes of handshaking, system architecture, setting up the UABG. The tracked states of two or more pairs of platforms then form a cluster (e.g., cluster cliques) for the purpose of state estimation and state tracking.

Pairing controller 153 may have housekeeping protocol/command that includes dismiss parent, request parent, accept child, reject child node, and request promotion.

Bi-directional communication. In this example, in which the communication link is optimized for efficiency and data size, the parent nodes 106a, 106b are each configured to communicate with other linked parent nodes and child nodes (108a, 108b, respectively) for a pairing. The child nodes 108a, 108b communicate with its respective parent nodes 106a, 106b of that pairing. In the example shown in FIG. 1, each platform 104, as a parent node 106 or a child node 108, is configured to determine distance or ranging measurements to another platform via its bi-directional communication. In other implementations, the ranging measurements may be acquired through separate ranging sensors or hardware.

In the example shown in FIG. 1, a cluster message 112 (shown as "$Msg_{P1,P2}$" 112) received and propagated by the parent node 106a from a sourcing parent node (e.g., 106c) to a recipient parent node (e.g., 106b) includes a header 114, ranging measurement 116, propagation measure 118, and equivalent measure 120. In this example the sourcing parent node (shown as "P1" 106c) is a part of the cluster (e.g., cluster clique) maintained by the parent node 106a for the purpose of its state estimation and tracking but is not a part of the pairing of the cluster A" 110a. The sourcing parent node is also maintaining the cluster (e.g., cluster clique) for a separate cluster (shown as 110c). The corresponding message 122, in the bi-direction communication link, from the parent node 106a to the sourcing parent node (e.g., 106c), and from the recipient parent node (e.g., 106b) to the parent node 106a, includes header 124, ranging measurement 126, and equivalent measure 128. The propagated measurements (e.g., in 118) are aggregated and shared in the equivalent measurements (e.g., 128). In some embodiments, the ranging measurement information 116 may be separately transmitted. Indeed, the messaging structure between parent nodes for interclique messaging can be the same as those between parent nodes for intraclique messaging. Rather, the degrees of state information being included in the message would vary based on whether the recipient parent node is also maintaining the same state information.

The node message 130 transmitted from a child node (e.g., 108a) to the parent node 106a includes header 132, ranging measurement 134, and propagation measure 136, and the node-cluster message 138 to the child node (e.g., 108a) from the parent node 106a includes header 140, ranging measurement 142, and equivalent measure 143. The messages (e.g., 112, 122, 130, 138) are encrypted (encryption structure not shown). In some embodiments, multiple messages that include the contents of messages 112, 122, 130, 138 may be transmitted, e.g., the ranging measurements may be, for example, transmitted in ranging messages (e.g., having structure similar to messages 138) that are supplemented by the propagation and equivalent measure messages (e.g., 112, 122).

Hardware. To provide the local orientation and ranging measurements, the platforms may be implemented with radios and inertial measurement unit (IMU), if mobile. For airborne platforms, the platforms may include an altimeter (if airborne) as well as other navigation sensors (e.g., GPS). The platforms 104 can be airborne vehicles, terrestrial vehicles, water vehicles, spacecrafts, or static structures, such a buildings, towers, etc. In the example shown in FIG. 1, the platform 104 (shown as 104a), e.g., executing a parent node 106 or a child node 108 in the cluster, includes a PNT chain controller 144, inertial sensors 146, position sensors 148, ranging/communication interface 150, and data store 152.

Inertial sensors 146 may include IMUs, gyroscopes, or other sensors that can provide single or multi-axis acceleration, single or multi-axis velocity, and/or multi-axis gyroscopic measurements. In some embodiments, the orientation sensors is configured to provide 1, 2, 3, 4, 5, 6, 7, 8, 9, 10, 11, 12, or more inertial measurements. Position sensors 148 may include PNT measurements, e.g., Global Navigation Satellite Services (GNSS), GLONASS, GPS (Global Positioning System), or BeiDou. Position sensors 148 may also include altimeter sensors to which positioning data can be ascertained in ranging applications with ground infrastructure. Ranging/communication interface 150 includes radio-based communication and network interfaces, proprietary and otherwise. In some embodiments, the ranging/communication interface 150 may include 5G-based, 6G-, or millimeter-wave communication. Additional examples of ranging/communication interface 150 are provided in [6], [7], and [8].

PNT chain controller 144 is configured to execute the graph factorization operations and positioning, navigation, and timing operation for the platform 104. In the example shown in FIG. 1, the PNT chain controller 144 (shown as 144') executes an inertial navigation filter 152, the pairing controller 153, and a factorized cluster filter 154. The navigation filter 152 is configured to receive inertial measurements (shown as "raw measurement") from the local, onboard inertial sensors 146 and updates its states based on the local, onboard sensor measurements (excluding the ranging measurements). The inertial navigation filter 152, for a parent node 106 and child node 108, then generates equivalent propagation messages. The child node 108 transmits the propagation measure (e.g., 136) to the parent node 106 to update their priors. The parent node 106 employs its internal equivalent propagation messages 156 (shown as "States" 156) to the factorized cluster filter 154. The equivalent propagation messages 156 may include position, velocity, and attitude estimates. The parent node 106 (as well as child node 108) then performs an update of the states of the node/platforms of the cluster, via the factorized cluster filter 154, from the ranging measurement (e.g., 116, 126, 134), equivalent measure (120, 128), propagated measure (e.g., 118, 136), and, if available, measurements from its global positioning sensor 158. The factorized cluster filter 154, at least of the parent node 106, then recursively pass, filter, and generate the equivalent measurements throughout the distributed PNT chain network.

The equivalent measure 120, 128 among the parent nodes 106 allows the decentralization of the PNT controller among the parent nodes 106, which would only have to calculate and maintain the states for the cluster regardless of the network size.

The equivalent measure 143 between the parent node 106 and the child node 108 ensures the child node 108 has all the state information for a given cluster to ensure that the parent node designation can be reassigned to a child node when needed.

State information may include position, velocity, attitude, for airborne platforms and optionally yaw, pitch, and roll information.

The pairing controller 153 is configured to additionally (i) manage the handshaking protocol between clusters and (ii)

buffer the cluster filter's incoming and outgoing measurements. The pairing controller 153 may determine a cluster's proper parent cluster (if available) as described above and work with the other cluster controllers in the respective cluster to establish a proper parent-child relationship.

Inertial Navigation Filter. Each platform 104, in some embodiments, is implemented with an inertial navigation filter/manager system, such as would normally be used for a typical navigation GPS-driven system. The inertial navigation filter 142 is configured to operate with the factorized cluster filter 154 to accept 'equivalent measurements' from other filters of other clusters. The filters (e.g., 152, 154) are configured to (i) periodically publish a 'propagation measurement,' representing the change in navigation state produced by the IMU since the last such propagation measurement, and (ii) periodically publish an 'equivalent measurement', representing the change in navigation state produced by the other onboard sensors since the last such equivalent measurement.

The navigation state communicated by the equivalent and propagation measurements is preferably only a subset of the navigation state represented by the filters (e.g., 152, 154). For example, the filter may represent position, velocity, attitude, and bias but only communicate position and velocity.

Factorized Cluster Filter. As noted above, the factorized cluster filter 154 accepts propagation measurements and equivalent measurements from nodes 108 in the respective cluster, equivalent measurements from other clusters (e.g., cluster clique), and range measurements from the ranging radios. It requires the range measurements between platforms in its cluster or between platforms in its cluster and platforms in the parent cluster. The factorized cluster filter can be implemented as an Extended Kalman Filter, UKF (Unscented Kalman Filter), CKF (Cubature Kalman filter), Ensemble Kalman Filter (EnKF), other Kalman filter-based estimators, or other nonlinear state estimators. The factorized cluster filter periodically may publish, in some embodiments, three sets of 'equivalent measurements' per Table 1.

Figure 2A:
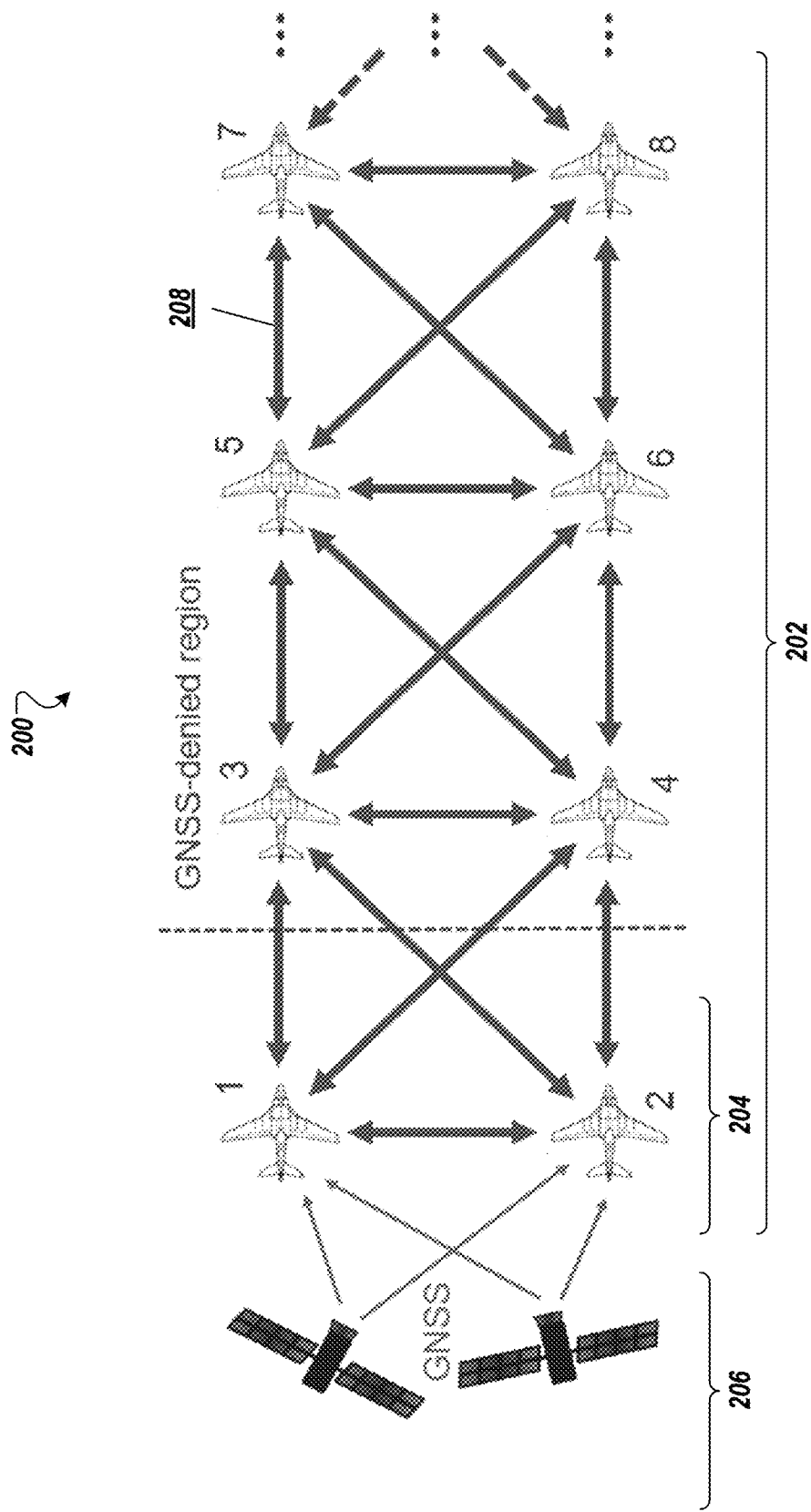
FIGS. 2A-2B show an example of a distributed positioning, navigation, and timing (PNT) chain and method of operation, e.g., for the system of FIG. 1, in accordance with an illustrative embodiment.

FIG. 2A shows a distributed PNT chain comprising a swarm of elements (i.e., platforms 104) equipped with ranging radios that form, via radio links between nodes, a truss structure the swarm can chain multilateration to an arbitrary number of elements, allowing precise positioning while at least two elements have GNSS reception. As discussed, the platforms 104 can be airborne vehicles, terrestrial vehicles, water vehicles, spacecraft, or static structures, such as buildings, towers, etc.

Chained Multilateration. To form the noted chain multilateration, in FIG. 2A, the swarm 200 includes networked elements $\mathcal{V}$ (202) with a known altitude, of which a subset $\mathcal{G} \subset \mathcal{V}$ (subset shown as 204) independently have a fully observable position via a GNSS receiver, visual odometry, or simply staying at a fixed, known location (shown as 206). Further, certain pairs of elements have a relative range-finding sensor which can estimate the distance (208) between them. Together, networked elements $\mathcal{V}$ (204) and the set of active observable range radio links $\mathcal{R}$ (208), can be represented as describing an undirected graph with vertices $\mathcal{V}$ and edges $\mathcal{R}$. A vertex $j \in \mathcal{V}$ can be considered to be in a PNT Chain $\mathcal{P}$ if it satisfies one of two conditions: (i) it has active absolute positioning, i.e., $j \in \mathcal{G}$, OR (ii) it has a known altitude and shares edges with at least two vertices already in a PNT chain. This can be applied recursively, i.e., "chained."

These conditions give the chain the rigid truss structure shown in FIG. 2A, making each node's 2D position fully observable. If a node's altitude is unknown, it may instead share edges with three vertices. Once a vertex has the requisite number of ranging measurements, its position can be multilaterated, and it can then be used to multilaterate the positions of additional "downstream" vertices.

Figure 2B:
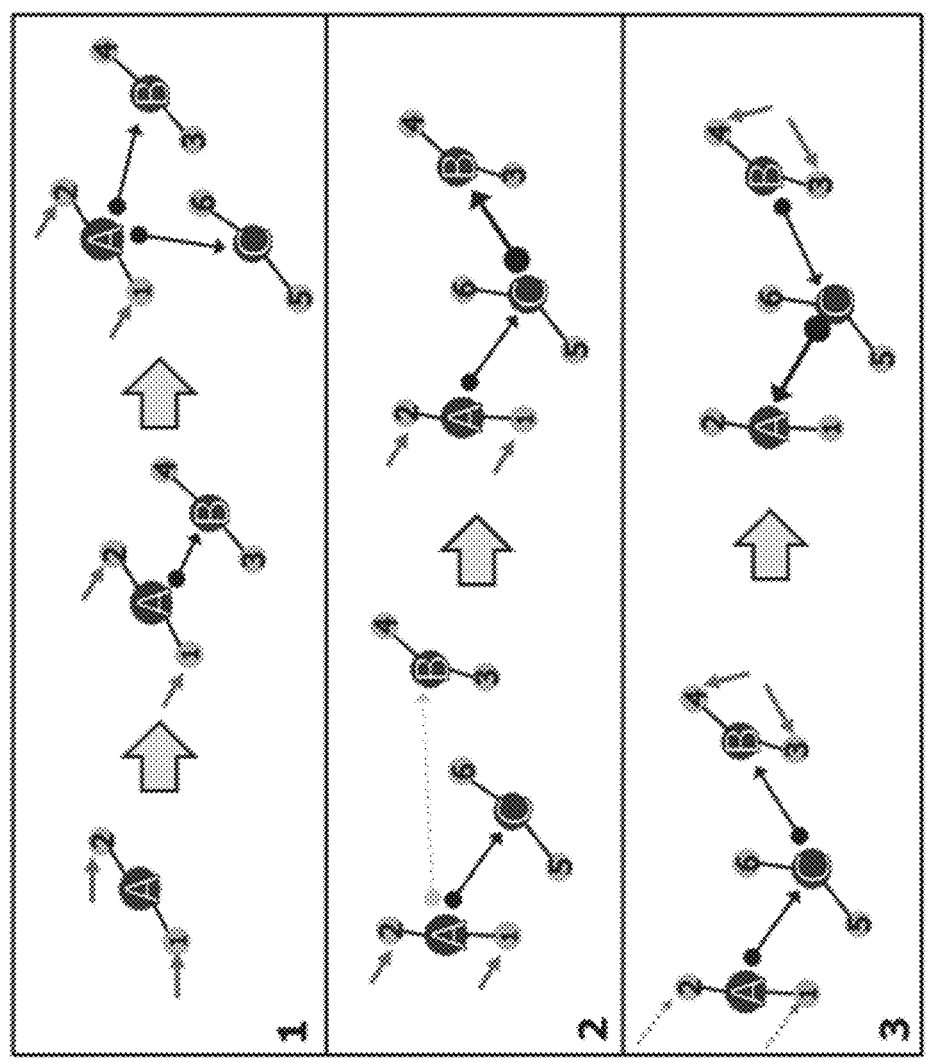
Figure 2B:
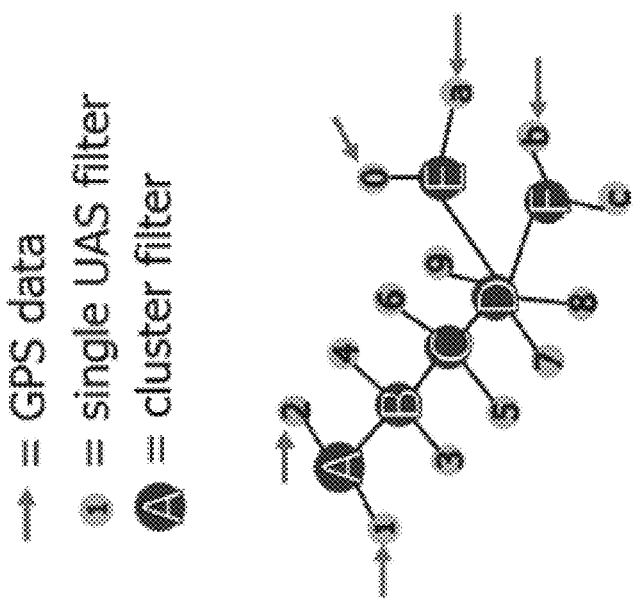

FIG. 2B shows another representation of the distributed PNT chain. In FIG. 2B, the clusters (e.g., cluster cliques) are linked to one another to form a multilateration chain in which the cluster node (i.e., parent node) is respectively linked to child nodes via pairings. In this example, several child nodes (shown executing filter, e.g., FIG. 5A) have

TABLE 1

| | |
|---|---|
| Type 1 | Equivalent measurements represent the change in state of the individual platforms in the cluster since the last such measurements were published. They exclude information derived from the equivalent measurements that came from that individual platform. |
| Type 2 | Equivalent measurements jointly represent the change in state of all the platforms in the cluster since the last such measurement was published. They exclude information derived from the equivalent measurements that came from any non-parent clusters. |
| Type 3 | Equivalent measurements jointly represent the change in state of all the platforms in the parent cluster since the last such measurement was published. They exclude information derived from the equivalent measurements that came from the parent cluster. |

Example Distributed Swarm Navigation with Factored Filters

FIGS. 2A-2B show an example of a distributed positioning, navigation, and timing (PNT) chain and method of operation, e.g., for the system of FIG. 1, in accordance with an illustrative embodiment. Specifically, FIG. 2A shows an example of a distributed, factorized positioning, navigation, and timing chain for a distributed network of a drone swarm that employs chain multilateration, e.g., for the distributed PNT chain of FIG. 1 in accordance with an illustrative embodiment. Multilateration is a triangulation that leverages the lengths of triangle edges rather than the angles to estimate unknown positions.

access to GPS or other global positioning data that provide a frame of reference to the entire distributed chain.

The factored cliques and equivalent measure structure are highly generalizable, allowing any number of cluster (e.g., cluster cliques) as long as: (i) the clique graph is acyclic, the neighboring/linked cluster cliques share states for at least 2 nodes, and new observations (e.g. GPS, altimeter, INS) can be introduced from any platform. The exemplary distributed PNT chain is robust to temporary loss of communication or measurements and can provide graceful degradation in face of permanent communication loss.

FIG. 2B shows an example of the formation of the distributed PNT chain, e.g., during initialization or during changes in platform locations. During initialization, the platforms may pair to one another to form a cluster (e.g., "1" and "2" paired as cluster "A" or cluster clique "A"), which then links to another cluster/cluster clique (e.g., cluster "A" linking to "cluster B"). The linkage in the distributed PNT chain may be evaluated in pre-defined time intervals, e.g., with each equivalent message propagation.

During an evaluation, each cluster (e.g., cluster clique) may make the 'most informative' cluster in the communication range its "parent"; that is, the cluster node providing the most equivalent measure (as shown in Scenario "1"). A disconnected cluster (disconnected in terms of communication link) can search for a new parent node (as shown in "Scenario 2"). If a child node (e.g., 108) becomes better informed than the parent node (e.g., 106) in the pairing, they can switch role (as shown in "Scenario 3").

Figure 3A:
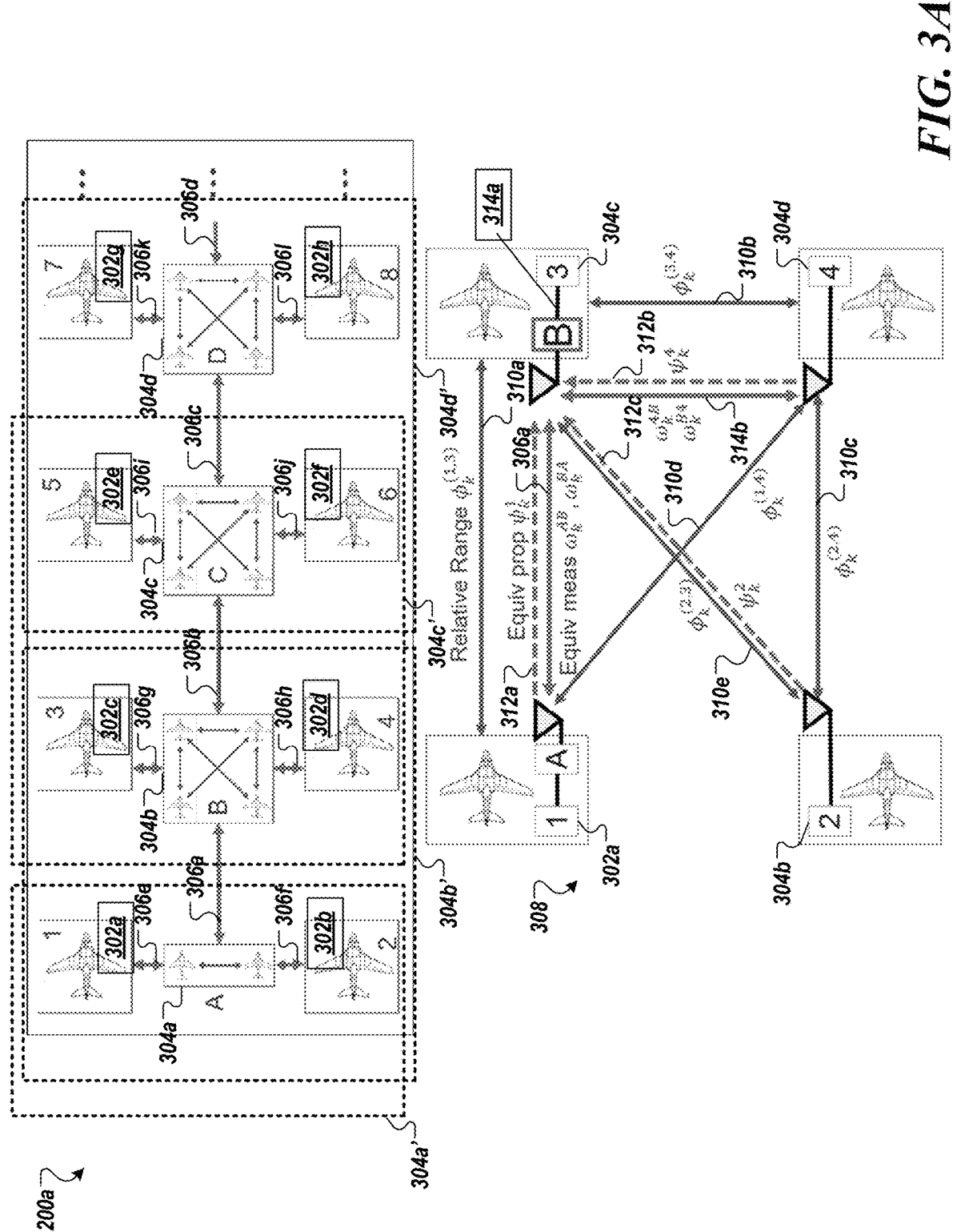
FIGS. 3A-3C show the messaging structure and operation for the exemplary distributed PNT chain, in accordance with an illustrative embodiment.
Figure 3B:
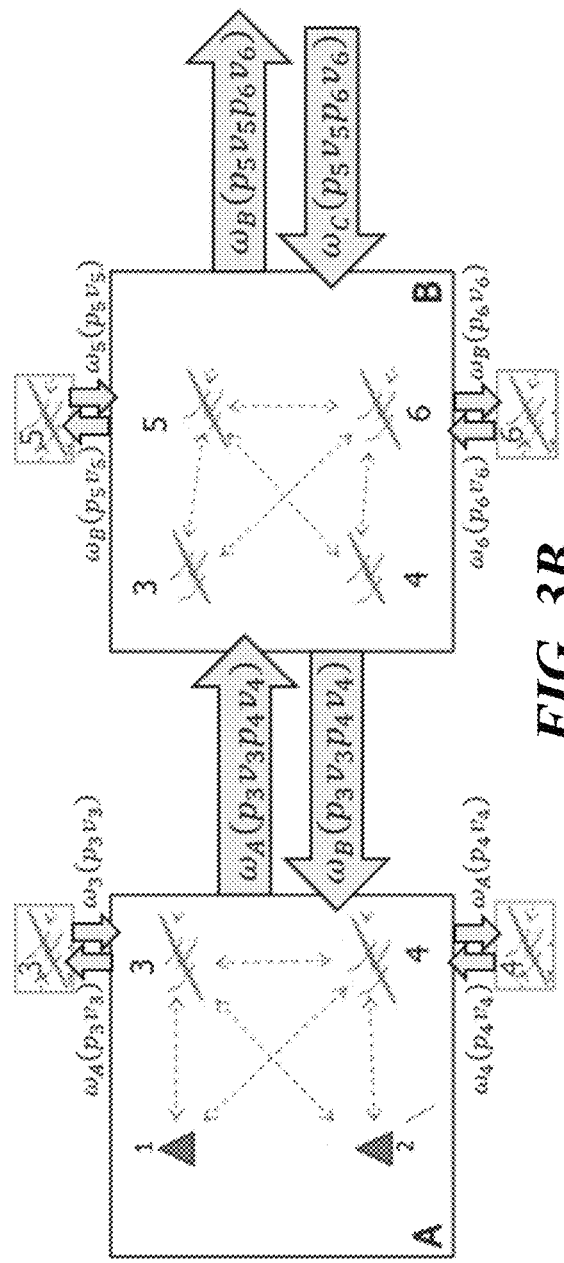

FIGS. 3A-3B show the messaging structure and operation for the exemplary distributed PNT chain, in accordance with an illustrative embodiment. In the example shown in FIG. 3A, the PNT chain 200 (shown as 200*a*) shows the messaging structure that is used to perform the multilateration in a non-linear state estimator, factored into a UABG of clique filters. The multilateration may be performed via Extended Kalman Filter (EKF), other Kalman-based filters, or non-linear state estimators as described or referenced herein. In FIG. 3A, local cliques 302 (shown as "1" 302*a*, "2" 302*b*, "3" 302*c*, "4" 302*d*, "5" 302*e*, "6" 302*f*, "7" 302*g*, and "8" 302*h*; also referred to previously as child node 108) in the non-linear state estimator (e.g., EKF) are represented as equivalent to navigation systems that can be formed into cluster cliques (shown as "A" 304*a*, "B" 304*b*, "C" 304*c*, and "D" 304*d*; also referred to previously as parent node 106) having corresponding platforms in cluster 304*a*', 304*b*', 304*c*', 304*d*', shown in FIG. 3A. The clusters, via one or more nodes (e.g., 106, 108), can then filter the range observations. The PNT chain 200*a* can minimize messaging bandwidth via equivalent measurements (shown as 306*a*-306*l*) passed between adjacent cliques in the UABG.

Figure 3C:
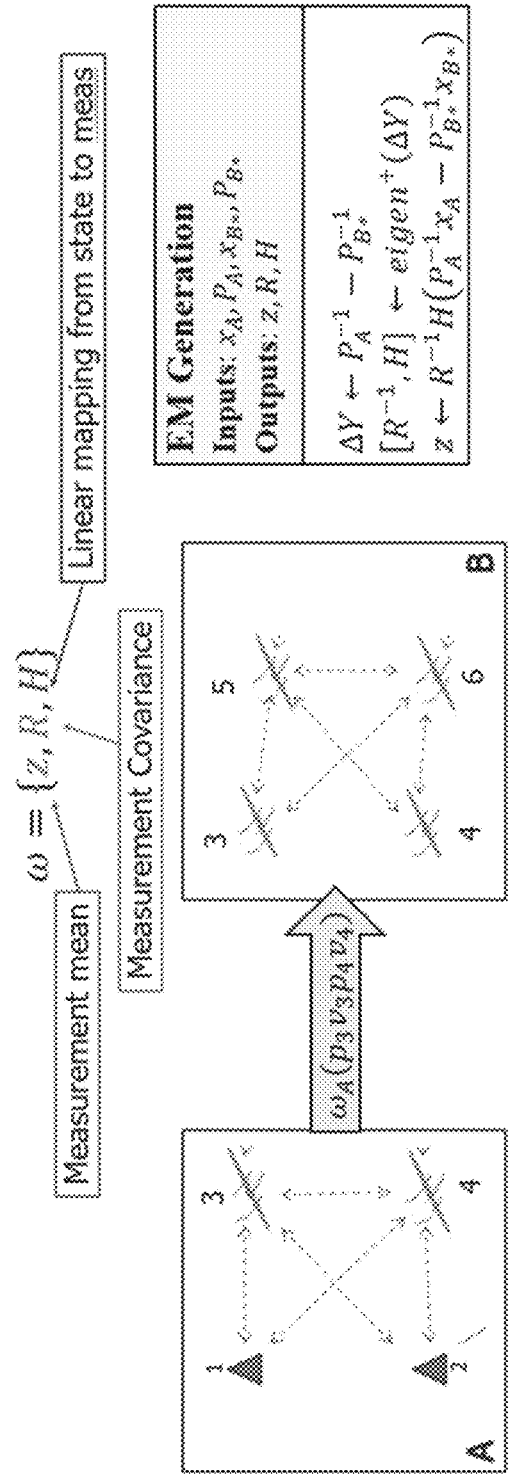

FIGS. 3B and 3C show example operations with respect to the equivalent measure. Each clique maintains its own copy of any shared states. Cliques (e.g., local or cluster cliques) use 'equivalent measurements' to coordinate on shared states. The recipient gains all information from a single Kalman Update in the equivalent measure message. In FIG. 3B, cluster clique (e.g., parent node 106) for cluster "A" is shown to provide state information (position p, and velocity v) of nodes "3" and "4" in equivalent measure $w_A$ to cluster "B." Cluster "B" similar reciprocates and provide its state information (position p, and velocity v) of nodes "3" and "4" in equivalent measure $w_B$ to cluster "A" while also providing state information of nodes "5" and "6" to cluster "C." In this representation, equivalent propagation measures from node "3" or node "4" are shared with the designated parent node. In FIG. 3C, the 'equivalent measurements' (also referred to herein as "equivalent measure") are shown to include a measurement z, a measurement covariance R, and the linear mapping of the state of the measurement H. Equivalent measure data communicate new information about the shared states. To this end, in the example in FIG. 3C, the equivalent measure from cluster "A" to cluster "B" includes information currently known by cluster "A" excluded (minus) with the information already known by cluster "B." Equivalent measure has a general solution for Gaussian case (i.e., Kalman filter).

The exemplary PNT chain operator can employ a distributed nonlinear state estimator to, for example, improve modern Positioning, Navigation, and Timing (PNT) systems, which often rely on the Global Navigation Satellite Services (GNSS), such as Galileo, GLONASS, GPS (Global Positioning System), or BeiDou. GNSS receivers use time-based multilateration to align their internal clocks with those of the GNSS and estimate their own location. Multilateration is similar to triangulation but leverages the lengths of triangle edges, rather than the angles, to estimate unknown positions [1], [2]. The precision of that estimate is based on the temporal precision of the sensor, as well as the positioning of the transmitting satellites (which since they are on highly predictable ballistic trajectories, is very precise).

Though GNSSs are ubiquitous, they can be unreliable in indoor, mountainous, or dense urban environments where physical obstructions block the line of sight to the satellites. Additionally, an adversary could attempt to jam or spoof GNSS signals, imperiling both military and civilian systems that rely on them for critical navigation functions. Inertial Navigation Systems (INS) use dead reckoning to estimate their positioning [3], [4], but these are susceptible to significant additive drift for long flight times. Visual odometry can reduce this drift significantly [5] but only works in environments with visually salient features.

Several tactical data links, like Link-16, use ranging radios to provide timing and relative navigation (RELNAV) [6], [7], [8] between platforms that maintain the line of sight, much like GNSS. Unlike GNSS receivers, ranging radios can operate with only the line of sight with one another and, therefore, can work independently of GNSS (even indoors). However, ranging radios and other relative navigation sensors can not maintain the correlations in errors between various platforms. To maintain covariance consistency, legacy RELNAV systems can degrade the precision of the output estimates, though the solution quality can also rapidly degrade over multiple ranging hops.

Here, the exemplary PNT chain operator employs a distributed nonlinear state estimator such as an Extended Kalman Filter (EKF), UKF (Unscented Kalman Filter), CKF (Cubature Kalman filter), the Ensemble Kalman Filter (EnKF), or other non-linear state estimators described herein. The exemplary PNT chain, e.g., as described in the examples of FIGS. 1-4, can track inter-UAV error correlations via covariance matrices that persist between updates thus allowing the generation of precise solutions over arbitrary numbers of hops. The non-linear state estimator are factored into small cliques, where each clique is tractable for real-time, embedded computation. Additional descriptions of factorization are provided in [9]. Communication can further be reduced or minimized by the allocation of the cliques to physical nodes based on the network topology.

Positioning and Navigation Filters. In most real-life applications of interest, the swarm elements' poses are dynamic, and the various system measurements (including the ranging measurements) are asynchronous. The position estimation problem, therefore, requires joint estimation of kinematics over time. In a real-world swarm, cheap onboard Inertial Measurement Units (IMUs) can be leveraged to measure target kinematics. IMUs, however, themselves tend to accumulate biases over time, which add additional degrees of freedom that need to be estimated.

In the case of a PNT Chain, several factors push toward a filter solution rather than a smoother. First, the state space at each time step already scales linearly with the number of nodes; further increasing the number of states to accommodate smoothing is computationally costly. Second, in a PNT Chain consisting of no static elements, there are few long-term loop closures that a smoother could usefully exploit. Simultaneously, a smoother would include many short-term loop closures that reduce the effectiveness of factorization techniques. Finally, a filter implementation of a PNT Chain can be fused with a modular smoother implemented in parallel, such as one for visual odometry.

The filter problem can be expressed per Equation 1:

$$\hat{X}_k = \underset{X_k}{\mathrm{argmax}}\, p(X_k|Z_{0:k}) = \underset{X_k}{\mathrm{argmax}}\, p(X_k|Z_k, \Xi_{k-1}) \quad \text{(Eq. 1a)}$$

In Equation 1a, $X_k$ is the joint state at the current time $t_k$; $Z_{0:k}$ is the set of all observations from a pre-defined point in time (all past observations or a portion of it) to the current observations k; $Z_k$ (or $Z_{k-1:k}$) is the set of all observations from time $t_{k-1}$ to $t_k$; $\Xi_{k-1}$ is the joint sufficient statistic at the time $t_{k-1}$.

The joint state $X_k$ includes the poses $\hat{x}_k^j$ of the constituent nodes j (e.g., neighbor) within Chain $\mathcal{P}$, $j \in \mathcal{P}$. Node poses $\hat{x}_k^j$ use ECEF (Earth-Centered, Earth-Fixed) coordinates per Equation 2:

$$\hat{x}_k^j = \left[ p_k^{jT}\, v_k^{jT}\, \theta_k^{jT}\, b_k^{jT}\, \beta_k^{jT} \right]^T \in \mathbb{R}^{15} \quad \text{(Eq. 1b)}$$

In Equation 1b, for an airborne mobile application, p corresponds to vector position (e.g., 3D position for airborne, or 2D, in some embodiments); v corresponds to 3D velocity; θ corresponds to 3D attitude (roll, pitch, yaw) typically represented as a unit quaternion; b corresponds to 3D accelerometer bias; β corresponds to 3D gyroscope bias, for a total of 15 degrees of freedom. And therefore, joint state $X_k$ can be represented by 15 sets of parameters for the size of the chain, $X_k \in \mathbb{R}^{15M}$, in this example, where the size of the chain $M=|\mathcal{P}|$.

A straightforward solution for Equation 1a would be a single, centralized EKF (executing in a central platform) that can estimate all the states from all the inputs. However, the approach requires sending all the observations to a central node, updating a 15·M state Kalman filter, and then sending the state updates back to the source platforms in real-time. In addition to the computational and communication bandwidth expenses, these requirements are contraindicated by the degraded communications environment implied by the GNSS-denied application.

Legacy RELNAV systems avoid bandwidth constraints by only using local EKFs, inflating the ranging measurement covariance by the positional uncertainty of the remote node. However, the inflation can create a significant loss of information, which can quickly degrade the operation over multiple hops.

Distributed filtering can split the difference by decomposing the nonlinear state estimator (e.g., EKF or other described herein) into a number of "cliques" that can track only a subset of the overall state. While several approaches exist, they tend to rely on "consensus" operations that often require a relatively high bandwidth to iteratively converge on a mathematical solution. Gossip networks have reduced bandwidth requirements at the cost of slower convergence.

In contrast, the distributed PNT Chain introduced herein, in solving Equation 1, can get the full state information updates while using a small number of messages by constraining updates to a factorized graph, e.g., an acyclic graph.

Example Graph Factorization

The exemplary PNT chain employs graph factorization operation to reduce the computational burden of multi-variable estimation problems/operations. In conditional probability estimation problems with independent measurement noise, a factorization often takes the form of $p(X|Z) \propto \Pi \Pi_{z^i \in Z}\, p(X^i|z^i)$, where X is the set of states being estimated; Z is the set of measurements (e.g., both from the IMU and other sensors); $X^i$ is the subset of states on which a measurement $z^i$ depends. Each factor $p(X^i|z^i)$ may be solved independently, but since multiple factors can use the same states, message passing may be employed to make the probability densities consistent across the various factors. An optimal message-passing regime has several constraints: (i) it should avoid over correlation by not sending the same message multiple times, which can compound errors and cause inconsistent probability distributions and (ii) it should also be efficient in that every time a message is passed, the recipient should resolve its estimation problem. In some embodiments, multiple messages can be sent, e.g., for communication encryption, redundancy, or encoding in which the information is parsed across multiple messages.

Bidirectional Message Passing: The exemplary PNT chain, preferably, employs an undirected Acyclic Bayes Graph (UABG) having an undirected architecture that can allow state information to be ingested at any clique, which in turn allows the cliques to be physically distributed while removing the need for global communication. The undirected Acyclic Bayes Graph architecture is acyclic (that is, an open-chain structure) and is implemented by constructing a tree (as a graph) via an algorithm or heuristic to enforce its constraint. By mapping the clique graph to the physical network topology (e.g., as described in relation to FIG. 2A or 3A), non-local communication can be optimally limited to the interclique message passing (e.g., among nodes (e.g., 106) representing the clusters). It is contemplated that other communication can be employed in addition to the interclique messages.

In FIG. 3A, example radio communications (308) for one of the clusters (e.g., the parent node 106) is illustratively shown from nodes $j \in \mathcal{C}^B$ comprising nodes "1" (302a), "2" (302b), and "4" (302d) to parent node "3" (310c) of cluster B (304c). The platform "3" hosting node "3" (302c) also hosts cluster clique "B" (304b), which receives ranging measurements (shown as 310a-310d) and equivalent propagation messages (shown as 312a-312c) (i) locally from local clique "3" (302c) and (ii) via communication links from cliques "1" (302a), "2" (302b), and "4" (304d). In FIG. 3A, equivalent messages are shown passed between cluster cliques and local cliques, e.g., locally from clique "3" (314a) and via radio from cluster clique "A" 306a (shown as 306a), clique "4" (shown as 314b), and cluster clique "C" (306b). Because clique "2" is a part of cluster 306a, an equivalent message is not shown between clique "2" and clique "3"; that equivalent message would be provided between clique "1" and clique "2" In some embodiments the, messages are transmitted in messaging structure, e.g., packet, as described in relation to FIG. 1.

Absent this message passing, in some embodiments, the individual cliques track the local joint state instead of the conditional state per $f_0^c \propto p(X^c|Z^c)$. Thus, to locally have the full, posterior distribution $p(X^c|Z)$, each adjacent clique $b \in v(c)$ must send the message per $\omega^{bc} = p(X^{b \cap c}|Z^{b'})$ where $X^{b \cap c}$ are the common states of cliques b and c, and $Z^{b'}$ are measurements that arrived in the graph in a node whose path to c must pass through b. In order to generate this message, clique b must, in turn, have received messages from each of its adjacent cliques other than c.

In contrast, in the preferred UABG configuration, because of the acyclic nature of the UABG, each update can be conditionally independent and can be performed as a multiplication operation to get the fully conditioned posterior distribution per Equation 2.

$$f^c = f_0^c \prod_{b \in \nu(c)} \omega^{bc} \propto p(X^c | Z^c) \prod_{b \in \nu(c)} p(X^{b \cap c} | Z^{b'}) = p(X^c | Z) \quad \text{(Eq. 2)}$$

As the PNT chain, when implemented as a filter, the posterior can be conditioned on a joint prior, sufficient statistic Ξ. In this case, the base clique can be determined per Equation 3 where the prior $p(X^c)$ is defined by the local sufficient statistic $Ξ^c$.

$$f_0^c \propto p(X^c | Z^c, \Xi) \propto p(Z^c | X^c) p(X^c) \quad \text{(Eq. 3)}$$

To prevent cluster clique c, in this example, conditioning on the prior multiple times, cluster clique b is configured, preferably, to remove the prior from interclique messages before passing them per Equation 4, referred to as the equivalent measurement (or equivalent measure).

$$\omega^{bc} = \frac{p(X^{b \cap c} | Z^B)}{p(X^{b \cap c})} \quad \text{(Eq. 4)}$$

The example equivalent measurement of Equation 4 can be modified in the case where cluster clique c (304c) is sent via a message (e.g., 306b), an equivalent measurement $\omega_{cb}$ first and that the equivalent measurement is not sent back to cluster clique c (304c) to be expressed as Equation 5.

$$\omega^{bc} = \frac{p(X^{b \cap c} | Z^B)}{p(X^{b \cap c}) \omega^{cb}} = \frac{p(X^{b \cap c} | Z^B)}{q^{bc}} \quad \text{(Eq. 5)}$$

In Equation 5, for notational (and algorithmic) representation, $q^{bc} = p(X^{b \cap c}) \omega^{cb}$ can be expressed as the effective prior that cluster clique b (304b) can be used for sending messages to cluster clique c (304c). Since the distributions of equivalent measurements are conditioned on a prior state, the distributions can be treated as regular measurements and filtered normally.

Directed Bayes Tree: Similar to undirected Bayes tree, Directed Bayes Tree (DBT), often used for estimation and smoothing problems, divides the EKF into fully independent cliques, $f^c p(X^{c \backslash \pi(c)} | Z^c, X^{c \cap \pi(c)})$ where $Z^c$ indicates the set of observations in clique c, and π(c) is the parent of c in the DBT. Messages passed from π(c) to c are simply $p(X^{c \cap \pi(c)})$, the probability distribution on the intersection of their states. DBT often works well in smoothing applications, where the states and measurements have a natural (temporal) ordering. In this case the DBT has a natural root—the current state estimate—and messages can simply be passed down the tree. Once a clique has received a message, its state estimate $X^c$ is fully conditioned on all current observations.

In some cases, factors can be combined into minimum-sized cliques, subject to the constraint that each clique only receives messages from a single parent clique. This often involves finding cycles in the factor graph and combining all factors involved in that cycle into a single clique. However, because new observations can only be added to the parent clique, the DBT can rule out potential mappings to physical implementations. In contrast, with the exemplary PNT Chain, all new measurements would be sent to the physical location currently computing the parent node to which the bidirectional message passing can reduce or remove communication bottleneck constraints.

Example Platform

Figure 4:
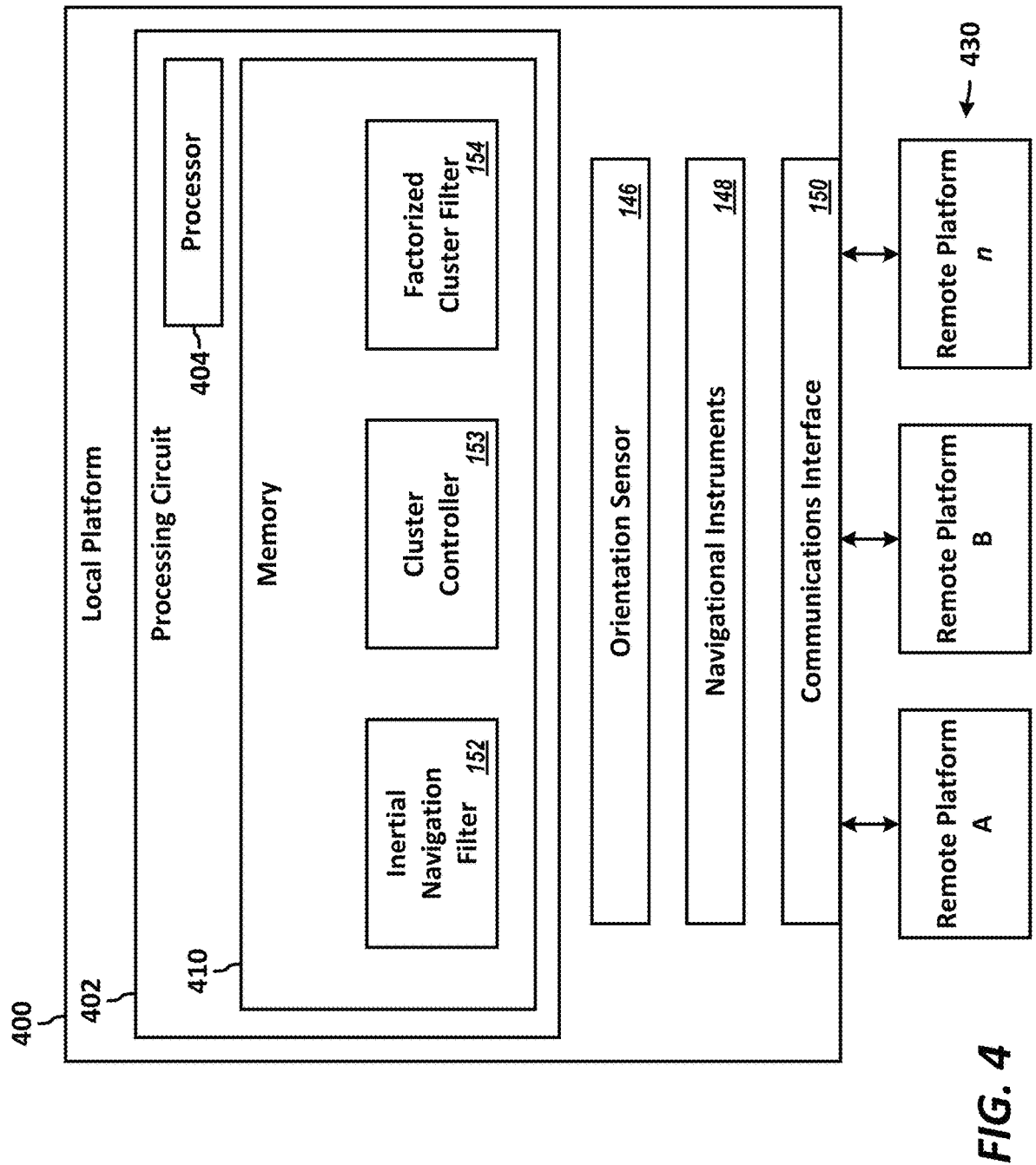
FIG. 4 shows an example platform in a distributed PNT chain, in accordance with an illustrative embodiment.

FIG. 4 shows an example platform 104 (shown as 400) in a distributed PNT chain, according to some implementations. The platform 400 can be airborne vehicles, terrestrial vehicles, above-surface water vehicles, spacecrafts, or static structures, such a buildings, towers, etc. In some embodiments, the platform 104 is a control module that is implemented in such structures, vehicles, or crafts.

The platform 400 is shown to include a processing circuit 402 that includes a processor 404 and a memory 410. Processor 404 can be a general-purpose processor, an application-specific integrated circuit (ASIC), one or more field programmable gate arrays (FPGAs), a group of processing components (e.g., a central processing unit (CPU)), or other suitable electronic processing structures. In some implementations, processor 404 is configured to execute program code stored on memory 410 to cause local platform 400 to perform one or more operations, as described below in greater detail. It will be appreciated that, in implementations where local platform 400 is part of another computing device, the components of local platform 400 may be shared with, or the same as, the host device.

Memory 410 can include one or more devices (e.g., memory units, memory devices, storage devices, etc.) for storing data and/or computer code for completing and/or facilitating the various processes described in the present disclosure. In some implementations, memory 410 includes tangible (e.g., non-transitory), computer-readable media that store code or instructions executable by processor 404. Tangible, computer-readable media refers to any physical media that is capable of providing data that causes local platform 400 to operate in a particular fashion. Example tangible, computer-readable media may include, but is not limited to, volatile media, non-volatile media, removable media and non-removable media implemented in any method or technology for storage of information such as computer-readable instructions, data structures, program modules or other data. Accordingly, memory 410 can include random access memory (RAM), read-only memory (ROM), erasable programmable read-only memory (EPROM), electronically erasable programmable read-only memory (EEPROM), hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 404, such as via processing circuit 402, and can include computer code for executing (e.g., by processor 404) one or more processes described herein.

While shown as individual components, it will be appreciated that processor 404 and/or memory 410 can be implemented using a variety of different types and quantities of processors and memory. For example, processor 404 may represent a single processing device or multiple processing devices. Similarly, memory 410 may represent a single memory device or multiple memory devices. Additionally, in some implementations, local platform 400 may be implemented within a single computing device (e.g., one server, one housing, etc.). In other implementations, platform 400 may be distributed across multiple servers or computers (e.g., that can exist in distributed locations). For example, local platform 400 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by two or more computers.

Platform 400 is also shown to include a communications interface 424 that facilitates communications between local platform 400 and any external components or devices, including a plurality of remote platforms 430. Accordingly, communications interface 424 can be or can include any suitable wireless communications interface (e.g., antennas, transmitters, receivers, transceivers, etc.) for conducting data communications. In some implementations, communications interface 424 includes at least a radio configured as a ranging radio for establishing a radio link with any of remote platforms 430 and wirelessly communicating data.

Example Inertial Navigation-Based System with Factorized Cluster Filter and Inertial Navigation Filter For single platform navigation, at time $t_k$, each active swarm node i within swarm $\mathcal{P}$ (i.e., i∈ $\mathcal{P}$) can be modeled or represented as having pose $x_k$ within states $\mathbb{R}$ (e.g., $x_k^i \in \mathbb{R}^{15}$, where the 15 states include the 3 coordinate positions, 3 velocities, 3 attitude (yaw, pitch, and roll), and 6 bias terms described in Equation 2 (3 for each of the sensor type)). To this end, an entire swarm of M elements can have state $X_k \in \mathbb{R}^{15 \times M}$.

Figure 5A:
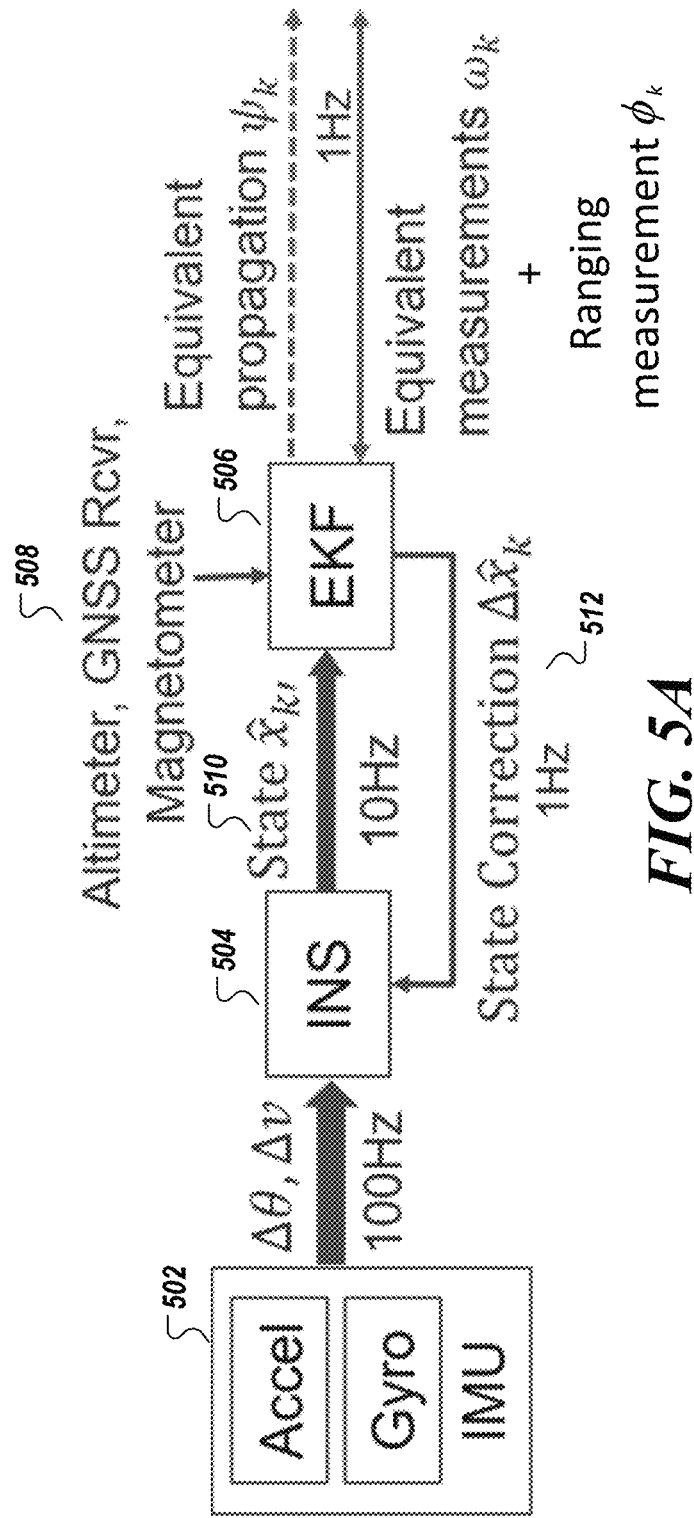

FIGS. 5A-5B show an example inertial navigation system model and operation that can execute in a platform of the distributed PNT chain, in accordance with an illustrative embodiment. Specifically, FIG. 5A shows an example inertial navigation system model that can execute in a platform 104 (e.g., in nodes 106 or 108). In FIG. 5A, the model of the onboard navigation system includes high-rate inputs from an IMU 502 configured to feed a pose estimator 504 (shown as "INS" 504), which feeds a full local non-linear state estimator 506 (shown "EKF" 506) that also processes sensor measurements 508 (shown as "Altimeter, GNSS Rcvr, Magnetometer" 508). With the inclusion of the equivalent propagation 510 and measurement interfaces 512 (equivalent and ranging), the local non-linear state estimator 506 can operate as a clique (302, 304) in the UABG.

In the example shown in FIG. 5A, the IMU 502 acquires and sends accelerometer and gyroscope updates (shown as $\Delta\theta$, $\Delta v$) to the pose estimator 504 at high rates $\Delta t''_k$ (in the example, shown as 100 Hz), and the pose estimator 504 converts the inputs into the n-DOF state estimate $\hat{x}_k^j$ 510 (e.g., 15-DOF states, per Equation 2). At a lower rate $\Delta t'_k >> \Delta t''_k$ (e.g., 10 Hz), the pose estimator 504 sends the state estimates $\hat{x}_k^j$, (510) to the local non-linear state estimator 506, which generates a forward propagation Jacobian $F_k^j$, which it uses to propagate the covariance $P_k^j$.

All the updates in the interval $(t_{k-1}t_k]$, $\Delta t'_k >> \Delta t''_k$ can be jointly modeled as an equivalent IMU update $n_k^j = x_k^j - (x_{k-1}^j)$, where $x_k^j$ is the local state after all INS updates. The distribution of the update can be modeled via a sufficient statistic with mean $\hat{n}_k^j$ and covariance $Q_k^j$ per Equation Set 6.

$$\hat{n}_k^j = \hat{x}_{k-}^j - (\hat{x}_{k-1}^j) \qquad \text{(Eq. Set 6)}$$
$$Q_k^j = P_{k-}^j - F_k^j P_{k-1}^j F_k^{jT}$$

In Equation Set 6, $F_k^j = \Pi_k F_k^j$, is the total linearized propagation. This model may hold while the forward propagation model is approximately linear, i.e., $\Delta t$ is not too large. It can be assumed that all sensors have additive white Gaussian noise (AWGN) and are locally linear; however, this linearity assumption can fail if the relative azimuth between nodes fails. All nodes periodically receive a noisy altimeter measurement: $\alpha_k^i = J_{pz} x_k^i + \mu_A$, $\mu_A \sim \mathcal{N}(0, R_A^i)$.

A subset $i \in \mathcal{G}_k \subset \mathcal{P}$ have active GNSS coordinate updates: $\gamma_k^i = J_p x_k^i + \mu_\Gamma$, $\mu_\Gamma \sim \mathcal{N}(0, R_\Gamma)$ and pairs of nodes $(i,j) \in \mathcal{R}_k \subset \mathcal{P} \times \mathcal{P}$ have periodic relative range observations: $\phi_k^{(i,j)} = \|J_p x_k^i - J_p x_k^j\| + \mu_\Phi$, $\mu_\Phi \sim \mathcal{N}(0, R_\Phi^{(i,j)})$, where $J_p$ is a position selection matrix.

The onboard non-linear state estimator 506 may use the altimeter and GNSS observations to perform an update (e.g., Kalman update) on the state. If $j \in \mathcal{G}_k$, the Kalman update may be represented as Equation set 7.

$$y_k^j = \begin{bmatrix} \gamma_k^j \\ \alpha_k^j \end{bmatrix} - \begin{bmatrix} J_P \\ J_{PZ} \end{bmatrix} \hat{x}_{k-}^j \qquad \text{(Eq. Set 7)}$$
$$S_k^j = \begin{bmatrix} J_P \\ J_{PZ} \end{bmatrix} P_{k-}^j \begin{bmatrix} J_P \\ J_{PZ} \end{bmatrix}^T + \begin{bmatrix} R_\Gamma^j & 0 \\ 0 & R_A^j \end{bmatrix}$$
$$K_k^j = P_{k-}^j \begin{bmatrix} J_P \\ J_{PZ} \end{bmatrix}^T S_k^{-1}$$
$$\hat{x}_{k0}^j = \hat{x}_{k-}^j + K_k^j y_k^j, \quad P_{k0}^j = P_{k-}^j - K_k^j \begin{bmatrix} J_P \\ J_{PZ} \end{bmatrix} P_{k-}^j$$

In Equation Set 7, $J_P$ and $J_{Pz}$ are the position and altitude selection matrices. If $i \notin \mathcal{G}$, then $\gamma_k^i$, $R_\Gamma^j$, and $J_P$ are replaced with null matrices. That is, if the node does not have access to the altimeter and GNSS data 508, the $\gamma_k^i$ term, position selection and update matrix $J_P$ and $R_\Gamma^j$ are set to null. After processing all updates, the change (512) in state $x_k^j - x_{k-}^j$ is sent back to the pose estimator 504 as a state correction.

Factorized Filter: Before physically distributing the PNT chain, the PNT chain would be factorized into cliques in which the network and swarm topology are constrained to the lattice structure, as described in relation to FIG. 2A, consisting of M/2 pairs of nodes with full range radio connectivity between adjacent pairs. Due to its linear structure, the architecture could support the UABG shown in FIG. 3A.

The method may include combining the IMU, GNSS, and altimeter factors into M cliques, one per node, whose states are just the pose of that node, and then determining M/2 cluster cliques. The combination may correspond exactly with a preexisting onboard navigation filter. Each cluster $c \in \mathcal{C}$ may then incorporate the ranging measurements between the pair nodes $\rho(c)$, and those with the upstream pair $\rho(\pi(c))$, with a state consisting of the position and velocity of the nodes in the base and upstream pair: $\hat{x}_k^c = [[p_k^{jT} v_k^{jT}] \forall j \in \mathcal{P}^c]^T$, $\mathcal{P}^c = \{\rho(c), \rho(\pi(c))\}$, so a clique has no more than $6|\mathcal{P}^c| = 24$ degrees of freedom, for the example provided in relation to FIGS. 2-3.

In contrast to a fixed DOF calculation that is independent of the number of platforms M, the centralized Kalman update would entail the local filter states $\hat{x}_k^j$ being overwritten by the state of the CEKF, which for a first order approximations, would require tremendous processing power, i.e., scaling as O(M²). In addition, all observations would have to be communicated to a centralized processing node, thus requiring high networking requirements.

The centralized Extended Kalman Filter (CEKF) would jointly estimate the state $\hat{X}_k$ and covariance $P_k$ of all the swarm elements, with the forward projection step being determined as $\hat{X}_{k-}=\hat{X}_{k-1}+N_k$, $P_{k-}=F_k P_{k-1} F_k^T + Q_k$, where $N_k$ is the concatenation of $n_k^j$, and $F_k$ and $Q_k$ are the diagonalized concatenations of $F_k^k$ and $Q_k^j$ respectively. The centralized Kalman update can be expressed as Equation Set 8 in which $A_k$, $\Gamma_k$, $\Phi_k$ respectively correspond to the concatenation of all measurements from the altimeter, GNSS, and relative range; $J_P$, $J_1$, $J_2$ are swarm position selection matrices, and $J_\Phi$ is the Jacobian of the swarm's relative range measurements.

$$y_k = \begin{bmatrix} \Gamma_k \\ A_k \\ \Phi_k \end{bmatrix} - \begin{bmatrix} J_P \hat{X}_{k-} \\ J_{PZ} \hat{X}_{k-} \\ \|(J_1 - J_2)\hat{X}_{k-}\|_2^T \end{bmatrix}$$ (Eq. Set 8)

$$S_k = \begin{bmatrix} J_P \\ J_{PZ} \\ J_\Phi \end{bmatrix} P_{k-} [J_P \ J_{PZ} \ J_\Phi]^T + \begin{bmatrix} R_\Gamma & 0 \\ 0 & R_\Phi \end{bmatrix}$$

$$K_k = P_{k-} \begin{bmatrix} J_P \\ J_{PZ} \\ J_\Phi \end{bmatrix}^T S_k^{-1}$$

$$\hat{X}_k = \hat{X}_{k-} + K_k y_k, P_k = P_{k-} - K_k \begin{bmatrix} J_P \\ J_{Pz} \\ J_\Phi \end{bmatrix} P_{k-}$$

Referring still to FIG. 3A, the cluster cliques are linearly arranged in the clique graph (e.g., 306a, 306b, 306c, 306d, . . . ), mimicking their physical juxtapositions and also share edges with the local cliques j∈ρ(c). If the cluster cliques are physically implemented on one of the nodes in the pair, then the overall communication bandwidth requirements are also minimized. All measurements (except for the ranging measurements) are processed locally, and the inter-clique messages and ranging measurements may be implemented so only a single radio hop is passed before being processed.

FIG. 5B shows an operation 520 (shown as "Algorithm 1" 520) to execute the distributed, factorized PNT chain (e.g., 200, 200a). The operation 520 includes the local navigation filters (e.g., 504) being updated (522) (e.g., normally) by the onboard IMU and sensor measurements (excluding the ranging measurements). The operation 520 then includes the local navigation filters (e.g., 506 of child nodes 108) generating (524) equivalent propagation messages, which then passed (e.g., via message 130) are used by all clusters (e.g., parent node 106) to update their prior states. The operation 520 then includes the cluster nodes (e.g., parent nodes 106) performing (526) state updates (e.g., Kalman updates) from the ranging measurements. The operation 520 then includes recursively passing, filtering, and generating (e.g., via cluster message 112, 122 and node-cluster message 138) the equivalent measurements throughout the network.

Local Onboard Clique Filter. To perform the operation 524, the local cliques (e.g. child nodes 108) (concurrent with one another among the different nodes) may operate almost exactly like the preexisting local filters, with two small modifications. First, the local cliques (e.g., child nodes 108) may produce (530) a reduced equivalent propagation $\psi_k^j$ with only position and velocity information and sends that to whichever cluster cliques are also tracking its state per Equation 9 where $J_{PV}$ is the position and velocity selection matrix.

$$\psi_k^j = \{n_\psi^j = J_{PV} n_k^j, F_\psi^j = J_{PV} F_k^j J_{PV}^T, Q_\psi^j = J_{PV} Q_k^j J_{PV}^T\}$$ (Eq. 9)

Second, the local cliques may participate in the equivalent measurement generation and filtering process described above. Correction of the INS may occur only after processing equivalent measurements.

Cluster Clique Filter. To perform the operation 526, the non-linear state estimator 506 (e.g., Kalman filter) for the cth cluster clique (e.g., parent node 106) has a state estimate $\hat{X}_k^c$, which includes the positions and velocities of all nodes j∈ $\mathcal{P}^c$ and a covariance $P_k^c$. At each time step, the cluster clique may (i) receive (532, 534) a set of equivalent propagation messages $\Psi_k^c$ and ranging measurements $\Phi^c$ cluster cliques and (ii) perform a forward projection step (536) from the equivalent propagation (532) and a Kalman update (538) from the ranging measurements (534). The forward propagation step (536) may be expressed per Equation 10.

$$\hat{x}_{k-}^c = \hat{x}_{k-1}^c + n_k^c, P_{k-}^c = F_k^c P_{k-1}^j F_k^{cT} + Q_k^c$$ (Eq. 10)

In Equation 10, $n_k^c$ is the concatenation of $n_\psi^j$; $F_k^c$ and $Q_k^c$ are the diagonal concatenation of $F_\psi^j$ and $Q_\psi^j$ respectively, for j∈ $\mathcal{P}_c$. The Kalman update (538) for the ranging measurements $\Phi_k^c = \{\phi_k^{(i,j)}\}$ (534) may then be expressed by Equation Set 11, where $J_1$ and $J_2$ are the appropriate position selection matrices, and $J_\Phi^c$ is the Jacobian of $\|(J_1-J_2)\hat{x}_{k-}^c\|_2$.

$$y = \Phi_k^c - \|(J_1 - J_2)\hat{x}_{k-}^c\|_2$$ (Eq. Set 11)

$$S_k^c = J_\Phi^c P_{k-}^c J_\Phi^{cT} + R_\Phi^c$$

$$K_k^c = P_{k-}^c J_\Phi^{cT} S_k^{c-1}$$

$$\hat{x}_k^c = \hat{x}_{k-}^c + K_k^c y, P_k^c = P_{k-}^c - K_k^c J_\Phi^c P_{k-}^c$$

Equivalent Measurement Processing: After all the local and cluster cliques have been propagated forward and updated by sensor measurements, the cliques start generating and processing equivalent measurements. Each clique a can generate a unique equivalent measurement for each neighboring clique b∈ν(a) in the UABG, using only information that clique b does not already have. It does so only when it has received and filtered the equivalent measurements from all other neighboring cliques. When the local cliques only have one neighbor in the graph that would generate the equivalent measurement (i.e., the cluster clique), the local cliques can generate their equivalent measurements immediately.

The cluster clique can generate the equivalent measurement's diagonal covariance $R_\omega^{ab}$ and transform $H_\omega^{ab}$ from clique a to b, e.g., via an eigendecomposition operator of the change in the Fisher information matrix of the shared states per Equation 12.

$$H_\omega^{abT}(R_\omega^{ab})^{-1} H_\omega^{ab} = J^{ab}(P_k^a)^{-1} J^{abT} - (P_{k-}^{ab})^{-1}$$ (Eq. 12)

In Equation 12, $J^{ab}$ is the matrix that selects variables shared by a and b, and $P_{k-}^{ab}$ is the prior covariance on shared variables (possibly updated by a previous equivalent measurement from b). The operation can provide that any singular values (corresponding to near-zero in the diagonal of $(R_\omega^{ab})^{-1}$), can be ignored by eliminating those degrees of freedom from the equivalent measurement.

The measurement state $z_\omega^{ab}$ can then be modified to Equation 13.

$$z_\omega^{ab} = R_\omega^{ab} H_\omega^{abT} \left( J^{ab}(P_k^a)^{-1} \hat{x}_k^a - (P_{k-}^{ab})^{-1} \hat{x}_{k-}^{ab} \right) \quad \text{(Eq. 13)}$$

The message $\omega_k^{ab} = \{z_\omega^{ab}, R_\omega^{ab}, H_\omega^{ab}\}$ is then sent to clique b, which immediately processes it via a Kalman update per Equation Set 14 where i is the index of the order of arrival of the equivalent measurements at clique b.

$$y_{k,i}^b = z_\omega^{ab} - H_\omega^{ab} J^{ba} x_{k,i-1}^b \quad \text{(Eq. Set 14)}$$
$$S_{k,i}^b = H_\omega^{ab} J^{ba} P_{k,i-1}^b J^{baT} H_\omega^{abT} + R_\omega^{ab}$$
$$K_{k,i}^b = P_{k,i-1}^b J^{baT} H_\omega^{abT} (S_{k,i}^b)^{-1}$$
$$\hat{x}_{k,i}^b = \hat{x}_{k,i-1}^b + K_{k,i}^b y_{k,i}^b$$
$$P_{k,i}^b = P_{k,i-1}^b - K_k^c H_\omega^{ab} J^{ba} P_{k,i-1}^b$$

Cluster b also may use $\omega_\omega^{ab}$ to perform a Kalman update on the clique-specific prior $P_k^{ba-}$ that will later be used to generate $\omega_k^{ab}$. Upon completing the filtering, each clique checks the list $\mathcal{L}_k^a$ of cliques that have sent it equivalent measurements thus far in time step k. The clique then generates an equivalent measurement $\omega_k^{bc}$ for any adjacent cluster $c \in \nu(b)$ where $\nu(b) \backslash c \subset \mathcal{L}_k^a$.

Experimental Result and Additional Examples

A study was conducted to develop an example of the exemplary PNT chain that can allow a networked swarm of drones to perform precise GNSS-denied positioning, via ranging radios. Because the sensors are nearly linear-Gaussian, and the INS' behavior can be well approximated as an equivalent propagation over a one-second timescale, the joint state of the entire swarm can be well estimated by an EKF, providing significantly higher precision than a purely localized navigation attempting to filter in the ranging measurements.

In the study improves over a centralized EKF that requires that all equivalent propagation messages and all sensor measurements be sent to a central node for processing, which would otherwise create a single point of failure, as well as a computational and communication bottleneck, especially as the size of the swarm scales. For example, a 20-element swarm with the pattern of ranging radios would require 46 ranging measurements, 19 altimeter measurements (one less than 20, if performed on one of the UAVs), 19 magnetometer measurements, and 19 equivalent propagations sent by radio each time step, to update a 300 state EKF. All of these scale linearly with the number of elements in the swarm. In contrast, the exemplary PNT chain using the factored, distributed EKF approach was observed to dramatically reduces these requirements. Using the UABG architecture, each cluster clique now only requires 6 ranging measurements, 3 equivalent propagations, and 3 equivalent measurements to be sent by radio each time step, to update a 24 state EKF. None of these values change as the swarm's size increases, since the cluster size does not change. In this example, the co-variance may have 576 parameters (compared to 100K+)

The factored approach was also observed to be more robust to asynchronous sensors, since equivalent measurements and equivalent propagations can be produced at arbitrary times. By deliberately generating them at the same time as the ranging measurements, the number of time steps that need to be processed relative can be greatly reduced relative to the fully centralized filter. The PNT Chain is flexible, allowing any network topology that can be mapped to a UABG. Additional future challenges include processing asynchronous measurements, and designing message passing and filtering protocols that are robust at missing or dropped messages.

Method of Test. To test the PNT Chain, a swarm containing multiple Unmanned Aerial Vehicles (UAVs) was modeled in Matlab. Each UAV contains: (i) a consumer-grade IMU accelerometer, updating at 100 Hz, with a scale factor error of 200 ppm, a velocity random walk of 250 µg/√Hz and a bias of 20 µg and (ii) matching IMU gyroscopes that can update at 100 Hz, with a scale factor error of 167 ppm, angular random walk of 2.8 mrad/√Hr and a bias of 8°/Hr. The UAVs were additionally equipped with (iii) a GNSS receiver, updating at 1 Hz, with 10 m RMSE in each dimension, (iv) an altimeter, updating at 1 Hz, with 10 m RMSE, (v) a magnetometer configured to update at 1 Hz, with 1° RMSE, (vi) a ranging radio configured to update at 1 Hz, with a maximum range of 15 km, and 10 m RMSE.

Each UAV includes an onboard INS and EKF using the architectures shown in FIG. 5A, with the INS sending state updates at 10 Hz, and recomputing its Gravity vector at 5 Hz. The onboard radios have lossless communication within their range of 15 km and none beyond that.

The study developed and evaluated multiple scenarios to test the distributed navigation algorithms. The first scenario has six hovering UAVs, spaced in a 2×3 grid, with 10 km spacing. After initiation, all but the westernmost pair are GNSS-denied.

Figure 6A:
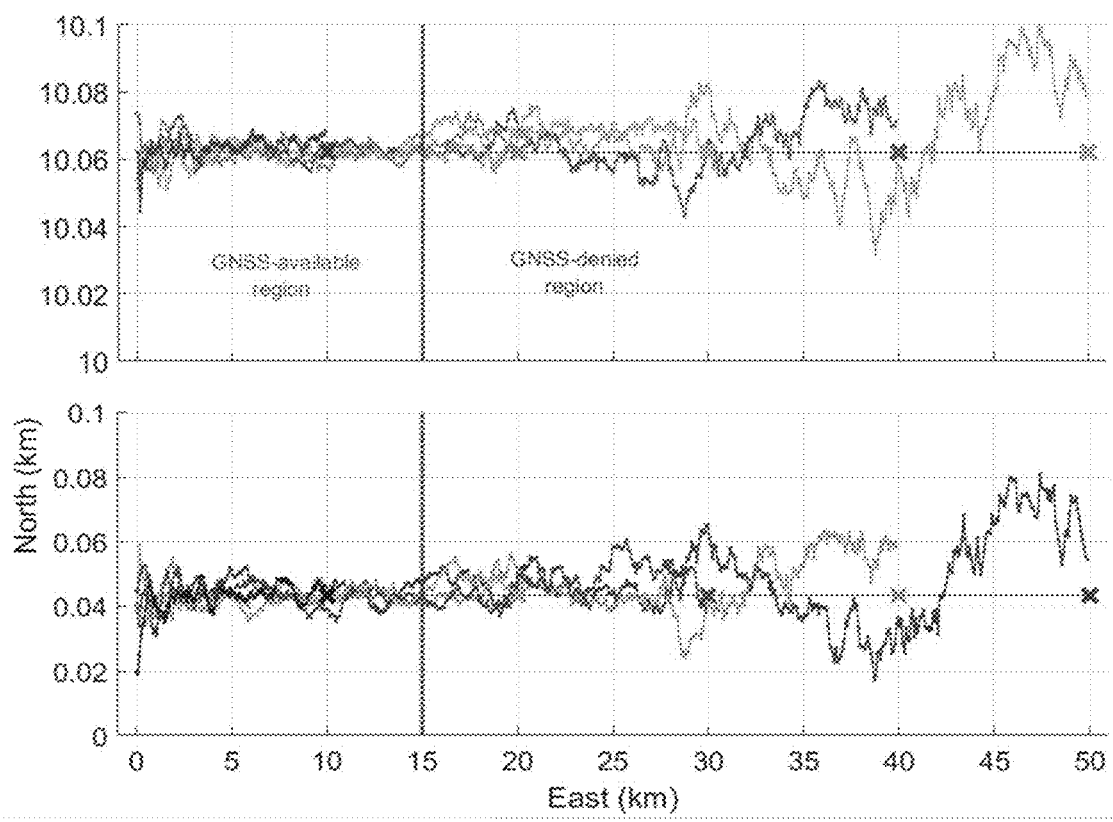
FIGS. 6A and 6B show performance results of an evaluated distributed PNT chain, in accordance with an illustrative embodiment.
Figure 6B:
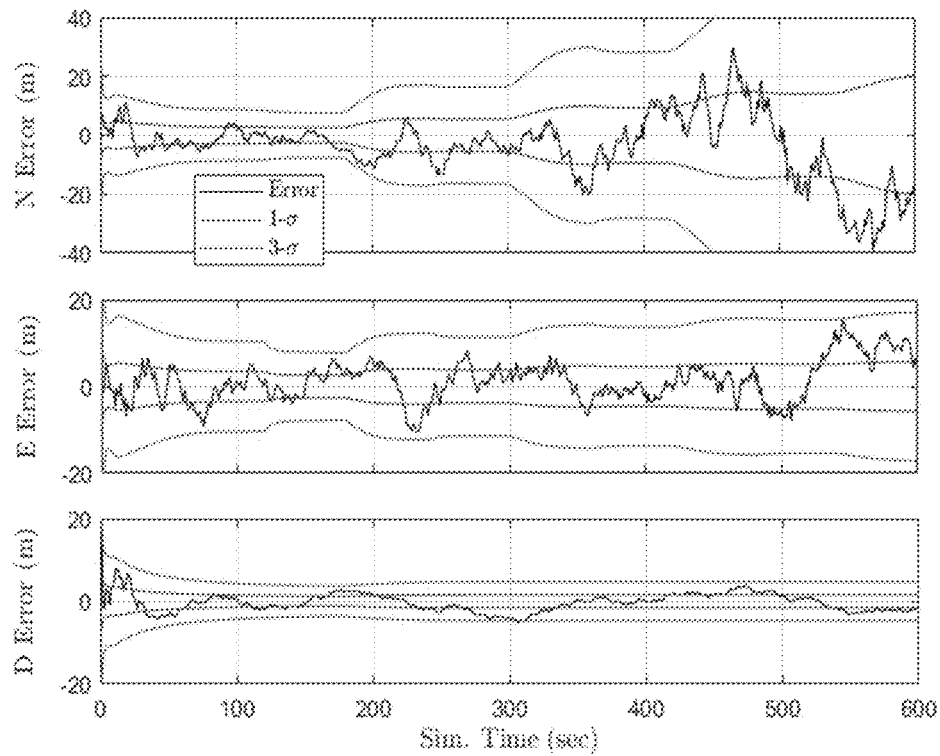

FIGS. 6A and 6B show performance results of an evaluated distributed PNT chain, in accordance with an illustrative embodiment. In the second scenario, illustrated in FIG. 6A, ten UAVs were spawned in pairs at 2-minute intervals. FIG. 6B depicts the trajectories and local positional estimates of the 10-element swarm using the distributed PNT Chain. Final true locations marked with 'X.' The pairs are separated 10 km north-south, and head due east at 5 km/min, creating 10 km spacing between pairs. Each pair is GNSS-denied 180 s after spawning. UAVs lose GNSS reception 15 km east of starting point, but only experience a small increase in north-south positional error. In both scenarios, UAVs are simulated in Earth Centered Earth Fixed coordinates, with the southern launch point originating in Atlanta, Georgia, at an altitude of 1 km. Both scenarios last 10 minutes.

Comparison Performance Analysis. The study used the scenarios to compare Matlab implementations of the following (i) legacy RELNAV algorithm, with the constraint that range observations are only filtered by a node when it has less than half the positional Fisher information as its partner, (ii) a fully centralized PNT Chain filter, and (iii) a distributed, factored PNT Chain filter, e.g., as described in relation to FIGS. 1-4.

After each time step had resolved, the study recorded and compared the local state estimate of each node (i.e., the INS-EKF state estimate) in the swarm with the ground truth. The normalized error estimate squared (NEES) was also computed as a measure of covariance consistency—that is, whether the statistics of the error is accurately modeled by the covariance: NEES($t_k$)=($\hat{x}_k-x_k$)$^T P_k^{-1}$($\hat{x}_k-x_k$)/$d_x$, where $d_x$ is the dimensionality of x. A NEES much larger than unity indicates an inconsistent covariance, whereas a NEES much smaller than unity indicates an overly conservative covariance. The NEES was computed only for the local position and velocity estimates, so $d_x$=6.

Results. FIGS. 7A-7E show comparative results of an evaluated distributed PNT chain as compared to a centralized PNT controller or distributed IMU-based controller, in accordance with an illustrative embodiment. As expected, the CEKF and the distributed PNT Chain algorithm performed very similarly, with their RMSE position error (averaged over 10 runs) growing to 7.9 m and 9.4 m over the course of scenario 1 (FIG. 7A), 11.5 m and 13.1 m over the course of scenario 2 (FIG. 7C). This compared extremely favorably to a legacy RELNAV solution (55 m and 130 m RMSE in the two scenarios).

Figure 7A:
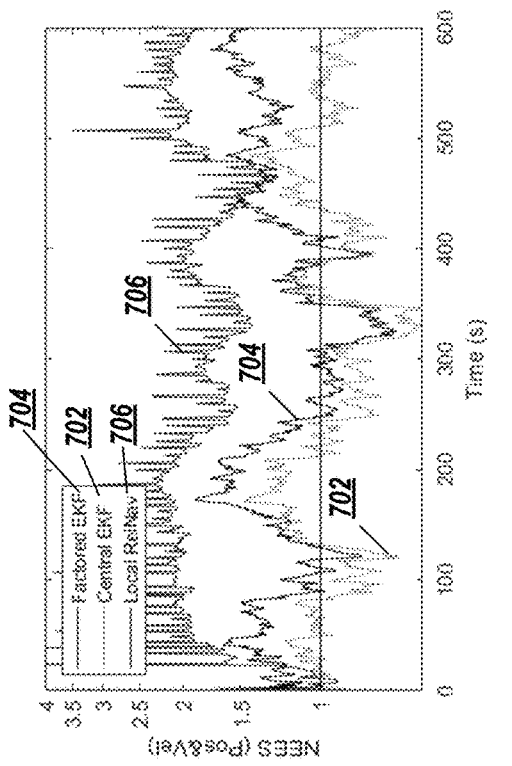
FIGS. 7A-7E show comparative results of an evaluated distributed PNT chain as compared to a centralized PNT controller or distributed IMU-based controller, in accordance with an illustrative embodiment.
Figure 7B:
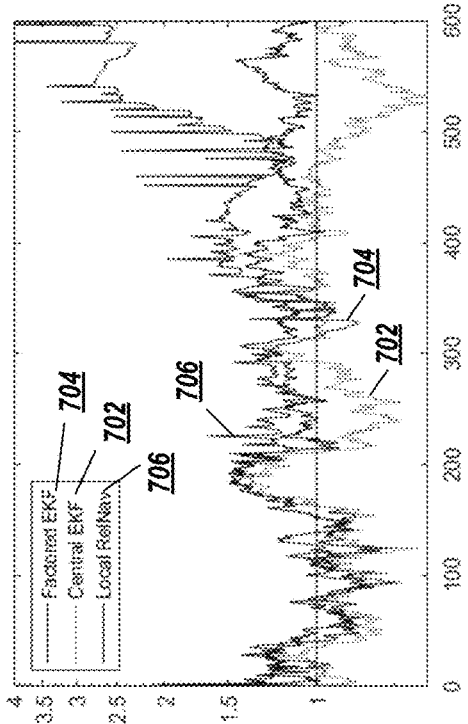
Figure 7C:
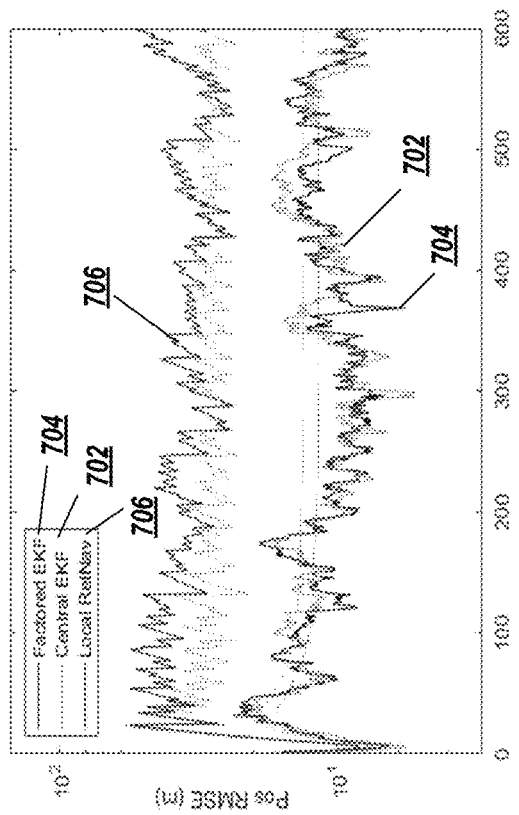

Specifically, FIGS. 7A and 7B shows the results of "Scenario 1" in which FIG. 7A shows the positional accuracy over the scenario, average of UAVs 1&2, along with root of the trace of the positional covariances. It can be observed that the centralized (702) and factored EKF (704) were both an order of magnitude more accurate than the RELNAV solution (706) by the end of the scenario. FIG. 7B shows the normalized error estimate squared (NEES), average of UAVs 1&2. A value of "1" represents a complete match between predicted uncertainty and actual error. All three algorithms maintained covariance consistency throughout the scenario.

Figure 7D:
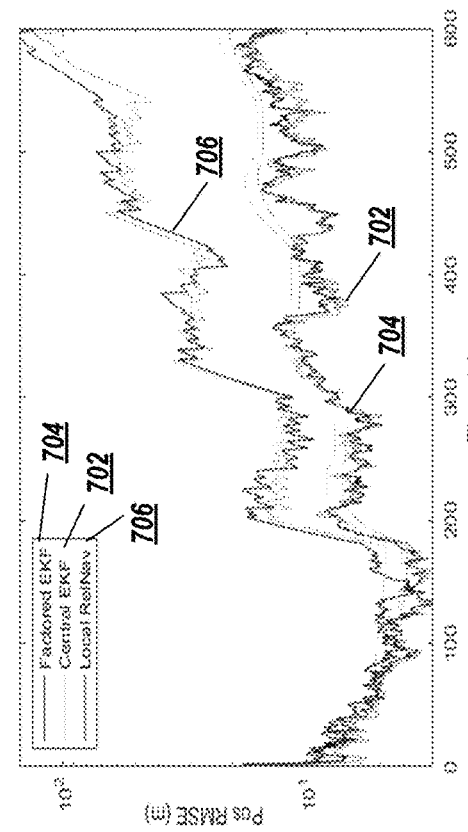

FIGS. 7B and 7D show that all of these algorithms maintained covariance consistency for the duration. FIG. 7B, in particular, shows the results of "scenario 2" in which FIG. 7B shows the centralized (702) and factored EKF (704) having similar positional accuracy over the scenario, and both were an order of magnitude more accurate than the RELNAV solution (706) by the end of the scenario. The dotted lines indicate the expected RMSE from the local covariance. FIG. 7D shows all three algorithms having maintained covariance consistency for the majority of the scenario, with the RELNAV solution (706) potentially becoming unstable towards the end.

The relative improvement in the performance of the distributed EKF (704) to the RelNav (706) appears to be a function of the number of "hops" $d_\mathcal{G}$ (j) to the closest swarm element with GNSS:

$$d_\mathcal{G}(j) = \min_{i \in \mathcal{G}} \min_{U \in \mathcal{U}(i,j)} |\mathcal{E}_U|.$$

In $\mathcal{U}$(i,j) is the set of connected subgraphs of ($\mathcal{P}, \mathcal{R}$) that contain vertices i and j, and $\varepsilon_U$ is the set of edges in subgraph U.

Figure 7E:
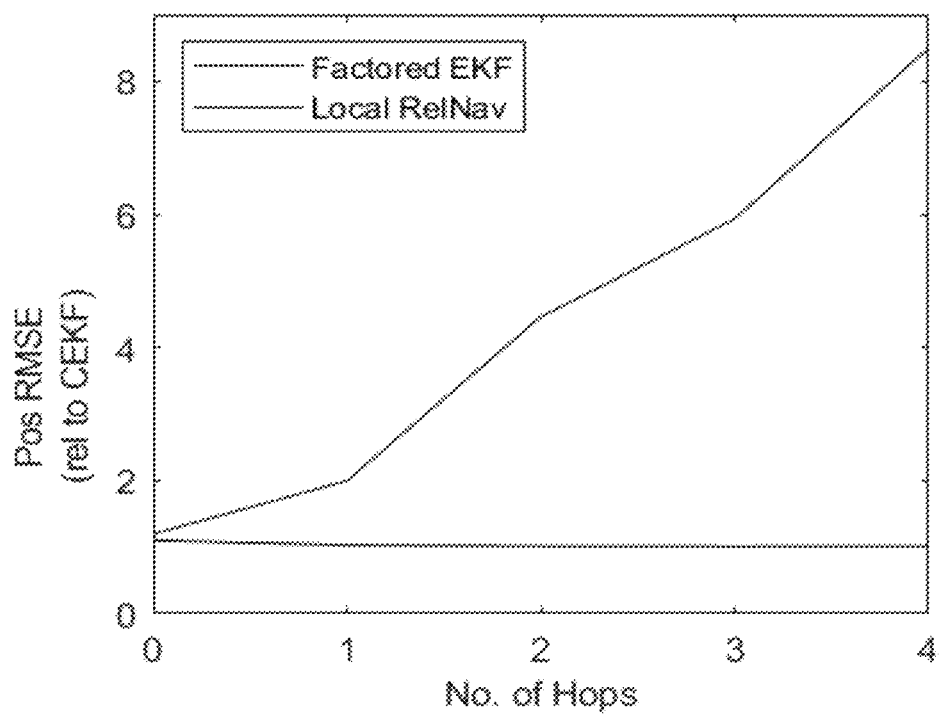

For example, in FIG. 7C, a distinct jump in the positional error appears every two minutes from the three-minute mark (when the number of hops increments by one), whereas no other obvious jumps in error occur in either scenario, ruling out time or distance as major contributors. This is also shown in FIG. 7E, which plots the average error in the last 30 seconds of scenario 2 as a function of hop distance. In particular, FIG. 7E depicts the positional error of UAV's local pose estimate by multilateration algorithm, relative to the "ideal" Centralized EKF, as a function of the number of range-radio "hops" to a node with GNSS reception. The distributed, factored EKF has nearly the same error as the CEKF, while the legacy RelNav errors are much larger. Errors are averaged over the last 30 s of all ten Monte Carlo runs of scenario 2, for both UAVs with that hop distance.

A detailed plot of the positional errors of one of the lead UAVs in the distributed PNT Chain in scenario 2 is shown in FIG. 6B, which depicts the positional error of the lead GNSS-denied UAV in a ten-element swarm, consistent with its internal covariance estimate. The UAV loses GNSS reception at 180 seconds, and every 120 seconds the next pair in the swarm loses GNSS as well. Because the chain is oriented East-West, the range observations provide far more information on that axis. The estimated uncertainty (measured by the standard deviation of error in the north-south, east-west, and down-up dimensions) shows predictable behavior: in the up-down dimension, which is constantly observed by the altimeter, the standard deviation quickly converges to under 1.6 m. The east-west uncertainty grows slowly to 6 meters, since it is also observed rather directly by the ranging measurements. The north-south error grows the most quickly to 20 meters, since the ranging measurements in that direction provide relatively little information. It was found that the centralized EKF took 16.1 seconds to run in scenario 2, compared to only 3.6 seconds for the distributed filter, or an average of 0.7 seconds per cluster clique.

Configuration of Certain Implementations

It is appreciated that certain features of the disclosure, which are, for clarity, described in the context of separate aspects, can also be provided in combination with a single aspect. Conversely, various features of the disclosure, which are, for brevity, described in the context of a single aspect, can also be provided separately or in any suitable subcombination. Unless defined otherwise, all technical and scientific terms used herein have the same meaning as commonly understood by one of ordinary skill in the art. Methods and materials similar or equivalent to those described herein can be used in the practice or testing of the present disclosure.

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

REFERENCES

The following patents, applications and publications as listed below and throughout this document are hereby incorporated by reference in their entirety herein:

[1] A. Savvides, H. Park, and M. B. Srivastava, "The n-hop multilateration primitive for node localization problems," Mobile Networks and Applications, vol. 8, pp. 443-451, 2003.

[2] A. Norrdine, "An algebraic solution to the multilateration problem," in Proceedings of the 15th international conference on indoor positioning and indoor navigation, Sydney, Australia, vol. 1315, 2012.

[3] C. Jekeli, Inertial navigation systems with geodetic applications. Walter de Gruyter, 2001.

[4] P. D. Groves, "Navigation using inertial sensors [tutorial]," IEEE Aerospace and Electronic Systems Magazine, vol. 30, no. 2, pp. 42-69, 2015.

[5] K. Yousif, A. Bab-Hadiashar, and R. Hoseinnezhad, "An overview to visual odometry and visual slam: Applications to mobile robotics" Intelligent Industrial Systems, vol. 1, no. 4, pp. 289-311, 2015.

[6] W. R. Fried, "Principles and simulation of jtids relative navigation," IEEE Transactions on Aerospace and Electronic Systems, no. 1, pp. 76-84, 1978.

[7] W. Altrichter, "Jtids relative navigation and data registration," in IEEE PLANS 92 Position Location and Navigation Symposium Record, pp. 152-161, 1992.

[8] T. H. Kerr and L. Chin, "A stable decentralized filtering implementation for jtids relnav (stable community relative navigation)," in PLANS '80—Position Location and Navigation Symposium, Atlantic City, NJ, pp. 318-329, 1980.

[9] H.-A. Loeliger, "An introduction to factor graphs," IEEE Signal Processing Magazine, vol. 21, no. 1, pp. 28-41, 2004.

[10] M. Kaess, H. Johannsson, R. Roberts, V. Ila, J. J. Leonard, and F. Dellaert, "isam2: Incremental smoothing and mapping using the bayes tree," The International Journal of Robotics Research, vol. 31, no. 2, pp. 216-235, 2012.

[11] U. A. Khan and J. M. Moura, "Distributing the kalman filter for largescale systems," IEEE Transactions on Signal Processing, vol. 56, no. 10, pp. 4919-4935, 2008.

[12] S. Das and J. M. Moura, "Consensus+innovations distributed Kalman filter with optimized gains," IEEE Transactions on Signal Processing, vol. 65, no. 2, pp. 467-481, 2016.

[13] H.-S. Shin, S. He, and A. Tsourdos, "Sample greedy gossip distributed kalman filter," Information Fusion, vol. 64, pp. 259-269, 2020.

[14] V. Indelman, S. Williams, M. Kaess, and F. Dellaert, "Information fusion in navigation systems via factor graph based incremental smoothing," Robotics and Autonomous Systems, vol. 61, no. 8, pp. 921-938, 2013.

[15] Y. Bar-Shalom, H. Chen, and M. Mallick, "One-step solution for the multistep out-of-sequence-measurement problem in tracking," IEEE Transactions on aerospace and electronic systems, vol. 40, no. 1, pp. 27-37, 2004.

What is claimed is:

1. A system comprising:
a first platform comprising:
one or more position or inertial sensors;
one or more ranging sensors, including a first ranging sensor; and
a controller having one or more processors and memory, the memory having instructions stored thereon, wherein the instructions, when executed by the one or more processors of the first platform, cause the one or more processors to:
receive sensor measurements from the one or more inertial sensors and the one or more ranging sensors;
receive a message from a second platform of a plurality of platforms, wherein the message comprises a second set of estimated states of one or more platforms that are included in a first cluster associated with the first platform and a second cluster associated with the second platform, wherein the second cluster includes the second platform and a set of neighboring platforms of the second platform;
determine at least one of position, velocity, and inertial values for the first platform using the received sensor measurements and the message;
determine, via a distributed estimation algorithm, a first set of estimated states corresponding to the first cluster which includes the first platform and a set of neighboring platforms of the first platform including a first neighboring platform, wherein the first set of estimated states form a subgraph of a complete graph, and wherein the complete graph corresponds to the plurality of platforms; and
execute control operations to adjust at least one of position, velocity, navigation, steering, or a combination thereof of the first platform using the first set and the second set of estimated states to maintain position or relative position or movement with at least the set of neighboring platforms of the second platform.

2. The system of claim 1, wherein the instructions, when executed by the one or more processors of the first platform, further cause the one or more processors to:
transmit the first set of estimated states, or a portion thereof, for the first platform and the set of neighboring platforms to the first neighboring platform, wherein the transmitted first set of estimated states are combined by the first neighboring platform with other shared estimated states of other neighboring platforms to determine positioning, navigation and timing information for the first neighboring platform.

3. The system of claim 1, wherein the distributed estimation algorithm comprises a distributed Kalman Filter generated via a graph factorization operation.

4. The system of claim 1, wherein the first set of estimated states includes a set of state values, and the message includes a portion of the first set of estimated states.

5. The system of claim 1, wherein the instructions, when executed by the one or more processors of the first platform, further cause the one or more processors to:
establish pairing among the first platform and the second platform; and
re-establish, at pre-defined time or criteria, pairing among the first platform and another platform of the plurality of platforms.

6. The system of claim 5, wherein re-establishing the pairing among the first platform and another platform of the plurality of platforms includes disconnecting the among the first platform and the second platform.

7. The system of claim 1, wherein the first platform further comprises a GPS receiver configured to determine a GPS-derived position of the first platform, the GPS-derived position being employed to provide positioning data to the distributed estimation algorithm.

8. The system of claim 1, wherein the one or more ranging sensors include an altimeter, the altimeter being configured to determine an altitude-derived position of the first platform, the altitude-derived position being employed to provide positioning data to the distributed estimation algorithm.

9. The system of claim 1, wherein the first set of estimated states are employed to determine a position data for the first platform, wherein the position data is compared to GPS data derived by the first platform, and wherein the comparison is employed to detect an anomaly associated with the GPS data.

10. The system of claim 1, wherein the one or more ranging sensors includes a wireless network communication interface.

11. The system of claim 1, wherein the one or more ranging sensors are configured to interrogate with IR waveform, laser pulse, radio-frequency waveform, microwave pulse, or acoustic waveform.

12. The system of claim 1, wherein the first platform comprises an unmanned vehicle or manned vehicle.

13. The system of claim 1, wherein the first platform comprises an unmanned aerial vehicle.

14. The system of claim 1, wherein the first platform and the second platform are the same type.

15. The system of claim 1, wherein the first platform and the second platform are different types.

16. A method comprising:
providing a first platform and a second platform each comprising (i) one or more position or inertial sensors, (ii) one or more ranging sensors, including a first ranging sensor, and (iii) a controller to execute a decentralized, collaborative navigation operation for a network of platforms;
at the first platform,
receiving a sensor measurement from the one or more inertial sensors and the one or more ranging sensors;
receiving a message from the second platform of a plurality of platforms, wherein the message comprises a second set of estimated states of one or more platforms that are included in a first cluster associated with the first platform and a second cluster associated with the second platform, wherein the second cluster includes the second platform and a set of neighboring platforms of the second platform;
determining at least one of position, velocity, and orientation values for the first platform using the received sensor measurement and the message;
determining, via a distributed estimation algorithm, a first set of estimated states corresponding to the first cluster which includes the first platform and a set of neighboring platforms of the first platform including a first neighboring platform, wherein the first set of estimated states form a subgraph of a complete graph, and wherein the complete graph corresponds to the plurality of platforms; and executing control operations to adjust at least one of position, velocity, navigation, steering, or a combination thereof of the first platform using the first set and the second set of estimated states to maintain position or relative position or movement with at least the set of neighboring platforms of the second platform.

17. The method of claim 16, further comprising:
at the first platform, transmitting the first set of estimated states, or a portion thereof, for the first platform and the set of neighboring platforms to the first neighboring platform, wherein the transmitted estimated states are combined by the first neighboring platform with other shared estimated states of other neighboring platforms to determine positioning, navigation and timing information for the first neighboring platform.

18. The method of claim 16, wherein the distributed estimation algorithm comprises a distributed Kalman Filter generated via a graph factorization operation.

19. The method of claim 16, further comprising:
at the first platform, establishing pairing among the first platform and the second platform; and
re-establishing, at pre-defined time or criteria, pairing among the first platform and another platform of the plurality of platforms.

20. A non-transitory computer readable medium having instructions stored thereon, wherein the instructions when executed by a controller of a first platform cause the controller to:

receive (i) a message and (ii) a sensor measurement from a second platform of a plurality of platforms, wherein the message comprises a second set of estimated states of one or more platforms that are included in a first cluster associated with the first platform and a second cluster associated with the second platform, wherein the second cluster includes the second platform and a set of neighboring platforms of the second platform;

determine at least one of position, velocity, and orientation values for the first platform using the received sensor measurement and the message;

determine, via a distributed estimation algorithm, a first set of estimated states corresponding to the first cluster which includes the first platform and a set of neighboring platforms of the first platform including a first neighboring platform, wherein the first set of estimated states form a subgraph of a complete graph, and wherein the complete graph corresponds to the plurality of platforms; and execute control operations to adjust at least one of position, velocity, navigation, steering, or a combination thereof of the first platform using the first set and the second set of estimated states to maintain position or relative position or movement with at least the set of neighboring platforms of the second platform.

* * * * *